United States Patent [19]
Hosono et al.

[11] Patent Number: 5,638,677
[45] Date of Patent: Jun. 17, 1997

[54] CONTROL DEVICE FOR HYDRAULICALLY PROPELLED WORK VEHICLE

[75] Inventors: Junichi Hosono; Seiji Tamura; Hideaki Sayama; Mitsuo Kihara; Kazuo Asano; Saburo Yoshio; Akira Tatsumi; Kazuhiro Ichimura, all of Ibaraki, Japan

[73] Assignee: Hitachi Construction Machinery Co., Ltd., Tokyo, Japan

[21] Appl. No.: 224,990

[22] Filed: Apr. 8, 1994

Related U.S. Application Data

[63] Continuation of Ser. No. 949,256, filed as PCT/JP92/00381, Mar. 27, 1992 published as WO92/17654, Oct. 15, 1992.

[30] Foreign Application Priority Data

Mar. 29, 1991 [JP] Japan ................... 3-091739

[51] Int. Cl.$^6$ ............................................. F16D 31/02
[52] U.S. Cl. .................... 60/431; 60/452; 60/445; 60/434
[58] Field of Search ..................... 60/431, 433, 434, 60/445, 452

[56] References Cited

U.S. PATENT DOCUMENTS

| | | | |
|---|---|---|---|
| 3,026,638 | 3/1962 | Hayner et al. | 37/907 X |
| 4,365,429 | 12/1982 | Ecker et al. | 37/348 X |
| 4,697,418 | 10/1987 | Okabe et al. | |
| 4,726,189 | 2/1988 | Tatsumi et al. | |
| 4,838,755 | 6/1989 | Johnson et al. | 60/431 |
| 5,077,973 | 1/1992 | Suzuki et al. | 60/434 |
| 5,081,838 | 1/1992 | Miyaoka et al. | 37/348 X |

FOREIGN PATENT DOCUMENTS

| | | | |
|---|---|---|---|
| 194331 | 8/1987 | Japan | 37/906 |
| 63-241226 | 10/1988 | Japan | |
| 2-190536A | 7/1990 | Japan | |
| 261133 | 10/1990 | Japan | 37/906 |
| 2-279836A | 11/1990 | Japan | |
| 2-291436A | 12/1990 | Japan | |

Primary Examiner—F. Daniel Lopez
Attorney, Agent, or Firm—Oliff & Berridge

[57] ABSTRACT

The current operational condition is discriminated as being the vehicle propulsion condition or the performing work condition. When the vehicle propulsion operational condition is discriminated, the maximum engine revolution speed is limited to a first revolution speed and the maximum displacement is limited to a first displacement value. When the performing work condition is discriminated, the maximum engine revolution speed is limited to a second revolution speed equal to or lower than the first revolution speed and the maximum displacement is limited to a second displacement value higher than the first displacement value. The first and second revolution speeds and the first and second displacement values are so determined that the first revolution speed multiplied by the first displacement value at least as relating to pressure for vehicle propulsion on level ground is less than the second revolution speed multiplied by the second displacement value as relating to the pressure for below the range of torque limitation control. By this, the pump output flow during vehicle propulsion on level ground is made lower than while performing work and, during vehicle propulsion, reduction of the pressure loss is made possible. Even with the identical pump pressure, the effective motor pressure is increased, so that its output torque can be increased. Because also the maximum displacement of the motor can be reduced according to the reduction of the maximum pump output flow amount, the construction of the hydraulic circuit can be made more compact.

5 Claims, 17 Drawing Sheets

FIG. IA
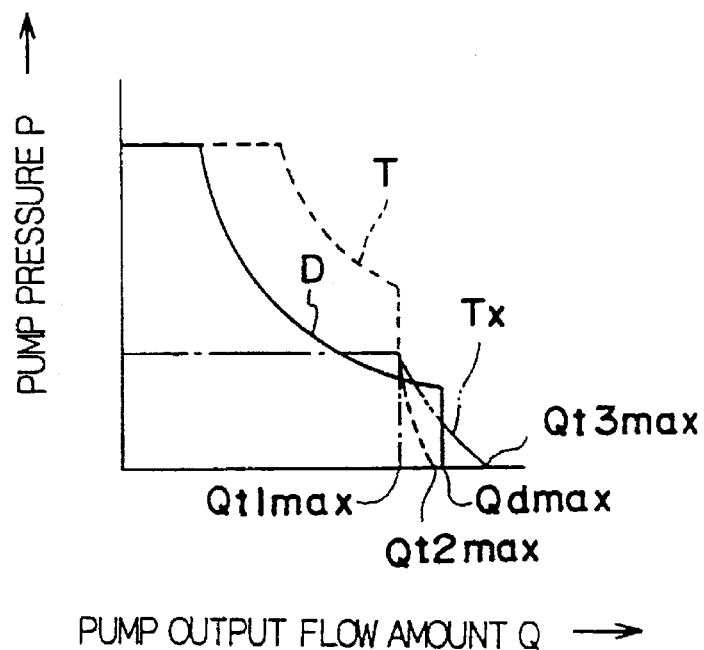
FIG. IB
PRIOR ART
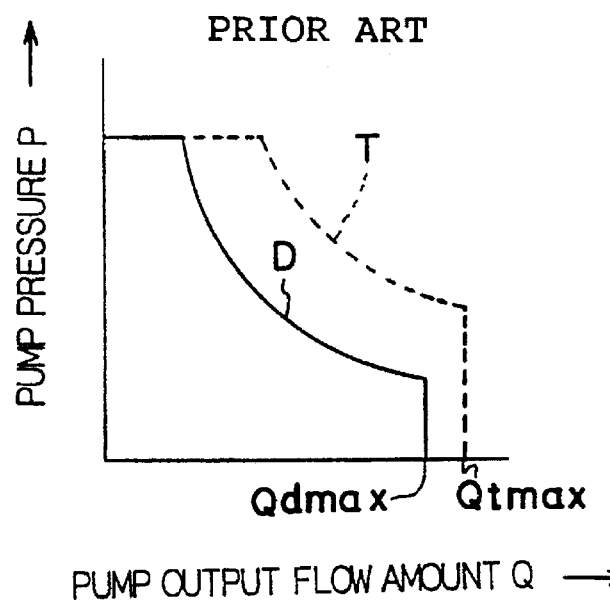

CONTROL DEVICE FOR HYDRAULICALLY PROPELLED WORK VEHICLE

This is a continuation of application Ser. No. 07/949,256, filed as PCT/JP92/00381, Mar. 27, 1992 published as WO92/17654, Oct. 15, 1992.

BACKGROUND OF THE INVENTION

1. Field of Art

The invention relates to a control device for a hydraulically propelled work vehicle in which both a hydraulic motor for vehicle propulsion and a hydraulic actuator for performing work are driven by a single variable displacement hydraulic pump.

2. Related Art

As a hydraulically propelled work vehicle equipped with this type of control device, there is, for example, a wheel type hydraulic shovel such as that shown in FIG. 9. Referring to that figure, the symbol F denotes a hydraulic motor for vehicle propulsion. Rear wheels M are driven by the rotation of the hydraulic motor F, via a transmission K and a propeller shaft L, so as to propel the vehicle. Further, a boom N, which forms one portion of a front attachment, is raised and lowered by the extension and contraction of a boom cylinder G.

FIG. 10 is a general view of a hydraulic circuit, for vehicle propulsion and for performing work, of a wheel type hydraulic shovel in which load sensing control and input torque limitation control are performed. The reference symbol A denotes a variable displacement hydraulic pump which is driven by an engine B. Its displacement is controlled by a tilt angle control device C in which load sensing control and input torque limitation control are performed. D is a control valve for vehicle propulsion, E is a control valve for performing work, F is a variable displacement hydraulic motor for vehicle propulsion, and G is a hydraulic cylinder for performing work. The hydraulic fluid ejected from the variable displacement hydraulic pump A is supplied, under the respective control of the control valves D and E, to the hydraulic motor F for vehicle propulsion and to the hydraulic cylinder G for performing work. Further, H is a pressure compensation valve which compensates for the fact that each of the actuators F and G is operated by pressures which are mutually independent, I is a counterbalance valve, and J is a center joint which connects together the hydraulic conduits in the upper rotating body portion and in the lower moving body portion.

Load sensing control is a type of control for the displacement of the variable displacement hydraulic pump A (hereinafter also termed the tilt angle) which controls it so as to keep at a constant value the pressure difference between the pressure upstream of the control valve D for vehicle movement or the control valve E for performing work and the pressure downstream thereof, i.e. the pressure difference between the inlet pressure (the pump pressure) to the control valve D or the control valve E and its outlet pressure (which is the greater one of the load pressure of the hydraulic motor F and the load pressure of the hydraulic cylinder G and is called the load sensing pressure). The pump pressure is maintained higher by just a fixed target value than the load sensing pressure.

Input torque limitation control is a type of control for the displacement of the variable displacement hydraulic pump A which controls the pump A so as to keep the pump A to a displacement value q which is calculated from a P-q graph showing the relation between pump pressure P and displacement q, based upon the pump pressure P, and sets the pump A to a displacement such that over the entire engine revolution speed range the engine power is not exceeded, in order to utilize the engine power effectively.

With such a single pump type of wheel type hydraulic shovel, the power required during vehicle propulsion is larger as compared with the power required while performing work, and in the prior art the P-Q graph for the variable displacement hydraulic pump A was set as shown in FIG. 1B. Referring to FIG. 1B, T is the graph applicable to vehicle propulsion, while D is the graph applicable while performing work. To improve fuel economy and control noise, while performing work, the practice is to decrease the engine revolution speed while increasing the maximum displacement of the hydraulic pump. However, the maximum displacement of the hydraulic pump while performing work is set to a value at which a desired front speed, at the maximum engine revolution speed while performing work, can be obtained. Furthermore, under the condition that the pressure during vehicle propulsion and the pressure while performing work are equal, the flow amount during vehicle propulsion is greater than or equal to the flow amount during excavation.

On the other hand, the maximum displacement of the hydraulic motor F is set to a value that permits a vehicle propulsion torque which provides a predetermined hill climbing capability and at which, during vehicle propulsion on level ground, a fixed maximum speed cannot be exceeded. At this time, of course the torque efficiency and the volumetric efficiency of the hydraulic motor should be considered.

As will be understood from FIG. 10, the greater part of the pressure loss in the hydraulic circuit for performing work is related to the control valve E; but in the hydraulic circuit for vehicle propulsion, apart from the pressure loss related to the control valve D, there are also contributions attributable to the counterbalance valve I and to the center joint J. Therefore as a whole, the pressure loss in the hydraulic circuit is quite great as compared to the pressure loss in the hydraulic circuit for performing work. However, as shown in FIG. 1B, in the prior art the maximum pump flow rate Qtmax during vehicle propulsion was arranged to be either identical to or greater than the pump flow rate Qdmax when performing work and the pressure loss during vehicle propulsion, was greater, which left room for improvement from the point of view of efficiency. That is to say, when during vehicle propulsion, in order to increase the power the engine revolution speed was increased and the pump output flow amount was also increased compared to its value while performing work. Then the pressure loss became larger and the propulsion torque became smaller although the motor volume is enough to obtain the desired propulsion torque. Further, the construction of the hydraulic circuit was increased in size, which was an invitation to a cost increase.

SUMMARY OF THE INVENTION

The object of the invention is to provide a control device for a hydraulically propelled work vehicle which, when the hydraulic pressure for vehicle propulsion and the hydraulic pressure for performing work are generated by a single pump, along with enhancing the propulsion performance by an improvement in the efficiency during vehicle propulsion, further allows the construction of the hydraulic circuit to be compact.

The invention is applied to a hydraulically propelled work vehicle, in which a variable displacement hydraulic pump disposed in an upper rotating body portion is driven by an engine, a hydraulic motor for vehicle propulsion disposed in a lower moving body portion and a hydraulic actuator for performing work disposed in the upper rotating body portion are driven by hydraulic fluid ejected from the hydraulic pump, and in which the revolution speed of the engine can be controlled by an engine revolution speed control means. Specifically the invention is applied to a hydraulically propelled work vehicle, in which at least a center joint is provided in the hydraulic conduit between the hydraulic pump and the hydraulic motor, and the hydraulic resistance of the distribution system for vehicle propulsion is greater that that of the distribution system for performing work. Furthermore, in order to limit the input torque, at least in a fixed pump pressure range, the displacement of the variable displacement hydraulic pump is increased or decreased according to the pump pressure. This sort of control is called input torque limitation control, and, in order to stabilize the vehicle speed during vehicle propulsion on level ground, generally the pressure during vehicle propulsion on level ground is set to be below the input torque limitation control range.

The above described objective is attained as described below.

A condition discrimination means is provided, which discriminates whether the current operational condition is the vehicle propulsion condition or the performing work condition, and the engine revolution speed control means limits the engine maximum revolution speed to a first revolution speed substantially when it is discriminated that the current operational condition is the vehicle propulsion condition and limits the engine maximum revolution speed to a second revolution speed substantially equal to or lower than the first revolution speed when it is discriminated that the current operational condition is the performing work condition, while a displacement control means limits the maximum displacement to a first displacement value when it is discriminated that the current operational condition is the vehicle propulsion condition and limits the maximum displacement to a second displacement value higher than the first displacement value when it is discriminated that the current operational condition is the performing work condition, with the first and second revolution speeds and the first and second displacement values being so determined that the first revolution speed multiplied by the first displacement value at least as relating to the pressure for vehicle propulsion on level ground is less than the second revolution speed multiplied by the second displacement value as relating to pressure below the range of torque limitation control.

When it is discriminated that the current operational condition is the vehicle propulsion condition, the maximum displacement of the variable displacement hydraulic pump is limited by a value which is smaller and the maximum engine revolution speed is limited by a value which is larger than in the case when it is discriminated that the current operational condition is the performing work condition. Further, the pump output flow amount at least during vehicle propulsion on level ground is made smaller than when work is being performed. During vehicle propulsion, pressurized hydraulic fluid is supplied from the hydraulic pump disposed in the upper rotating body portion via the center joint to the hydraulic motor disposed in the lower moving body portion, and, although the pressure loss is great, nevertheless, in contrast to the prior art, the maximum output flow amount of the hydraulic pump is reduced as compared to its value when performing work, so that the pressure loss can be restrained. As a result, along with making the effective motor pressure greater and thus being able to increase its output torque even with a identical pump pressure, it is also possible to reduce the maximum displacement of the motor by just the amount that the maximum pump output flow amount is reduced. Therefore the construction of the hydraulic circuit can be made compact.

Further, the first revolution speed for vehicle propulsion is greater than the second revolution speed for performing work. According to this, it is possible to generate the high power required at times of high pressure such as when the vehicle is being propelled up a slope or when it is being accelerated or the like.

Further, the displacement control means, in addition to the above described torque limitation control, along with being constructed so as to perform load sensing control in which the output pressure of the hydraulic pump is kept at just a fixed target value higher than the load pressure of the hydraulic actuator, during vehicle propulsion determines a maximum target displacement for vehicle propulsion and while performing work determines a maximum target displacement for performing work and selects the minimum one from among the target displacement for input torque limitation, the target displacement for load sensing control, and either the maximum target displacement for vehicle propulsion or the maximum target displacement for performing work; and said displacement variation means is controlled to become the selected target displacement. According to this, because at half throttle the pump outputs the flow amount required according to the amount of depression of the pedal, there is an improvement of the metering performance without any dependence upon the engine revolution speed.

There is further provided a slope descending detection means which detects when the vehicle is descending down a slope. The displacement control means, when it is detected that the vehicle is descending down a slope, sets the maximum displacement to a third displacement value higher than the first displacement value. According to this, when it is detected that the vehicle is descending down a slope, the maximum displacement of the pump becomes greater than during vehicle propulsion on level ground, so that the maximum vehicle speed when descending down a slope becomes faster as compared to the speed during vehicle propulsion on level ground. Further, because the output flow amount of the hydraulic pump is set to be greater when the vehicle is descending down a slope than when the vehicle is not descending down a slope, the vehicle propulsion pressure is kept higher than a predetermined value and thus the hydraulic brake valve is kept in its open condition so that hunting of the brake valve is prevented and an improvement in drivability results.

There is further provided a slope descending detection means which detects when the vehicle is descending down a slope, and the maximum target displacement for vehicle propulsion for when it has been detected that the vehicle is descending down a slope is set to a value higher than the value for vehicle propulsion on level ground. In this case as well, the vehicle speed when descending down a slope becomes faster.

There further provided a slope descending detection means which detects when the vehicle is descending down a slope, and, when it is detected by this detection means that the vehicle is descending down a slope, along with a means for engine revolution speed control lowering the revolution speed of the engine, a displacement control means limits the maximum displacement of the hydraulic pump to a value higher than during vehicle propulsion on level ground at a constant speed. According to this, because the engine revolution speed when the vehicle is descending down a slope is decreased from its value during vehicle propulsion on level ground and also the displacement is increased above its value during vehicle propulsion on level ground at a constant speed, the output power of the engine is optimally matched with the power consumed by the hydraulic pump. As a result, the specific fuel consumption when the vehicle is being propelled down a slope is improved.

There is provided a slope ascending detection means which detects when the vehicle is ascending up a slope, and the displacement control means, when the slope ascending detection means detects that the vehicle is ascending up a slope, along with the engine revolution speed control means increasing the revolution speed of the engine, limits the maximum displacement of the hydraulic pump to a value lower than during vehicle propulsion on level ground at a constant speed. Also when the vehicle is ascending up a slope, the output power of the engine is optimally matched with the power consumed by the hydraulic pump and, accordingly, the specific fuel consumption, not only when the vehicle is being propelled down a slope but also when the vehicle is ascending up a slope, is improved.

BRIEF DESCRIPTION OF DRAWINGS

FIG. 1A is a figure showing the P-Q characteristic of a hydraulic pump shown in FIG. 2;

FIG. 1B is a figure showing the P-Q characteristic of a prior art hydraulic pump;

DESCRIPTION OF THE PREFERRED EMBODIMENT

An embodiment of the invention will now be explained with reference to FIGS. 1 through 8.

Figure 2:
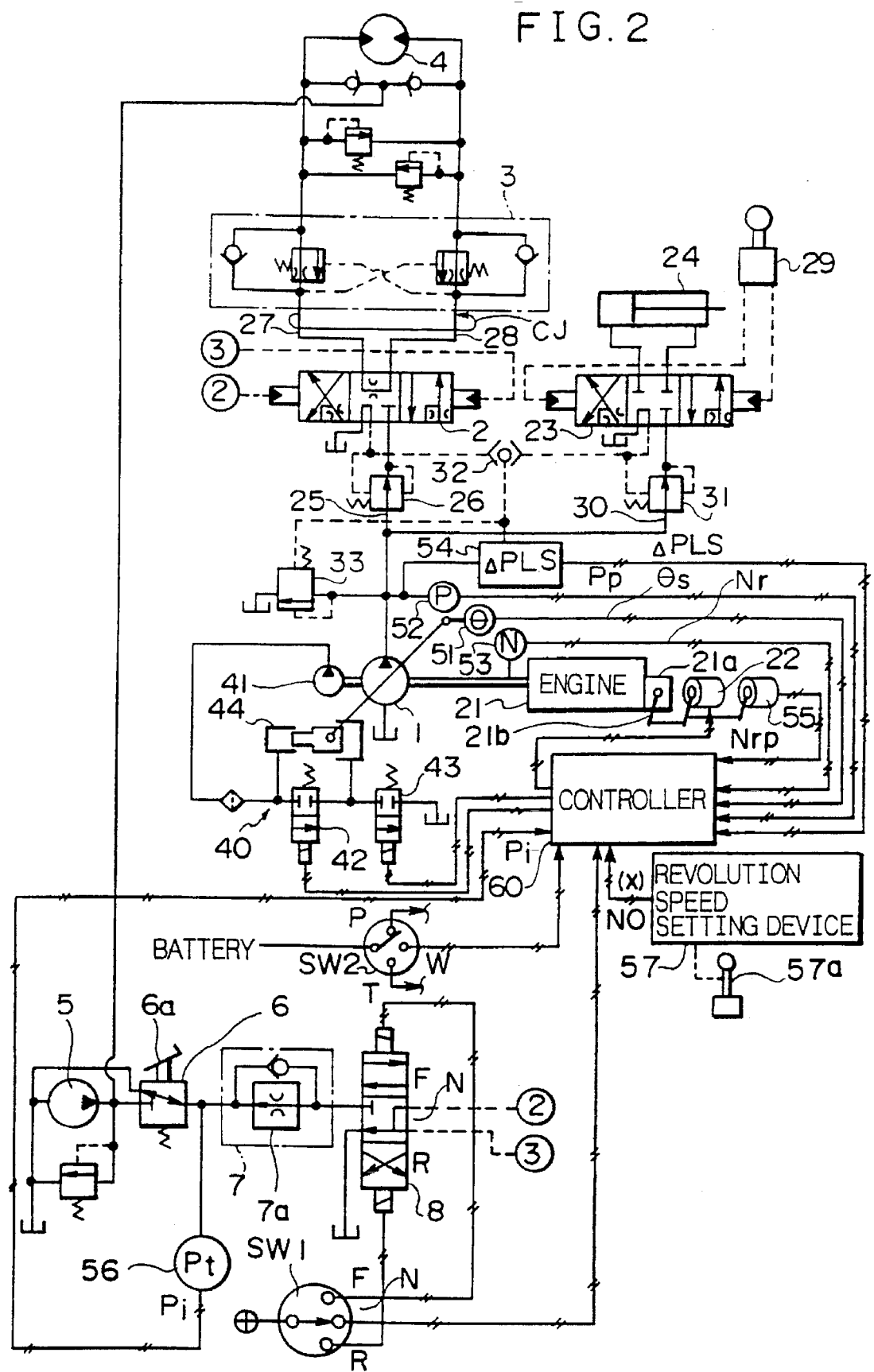
FIG. 2 is a figure showing the overall construction of a hydraulic drive control device according to the invention.
Figure 3:
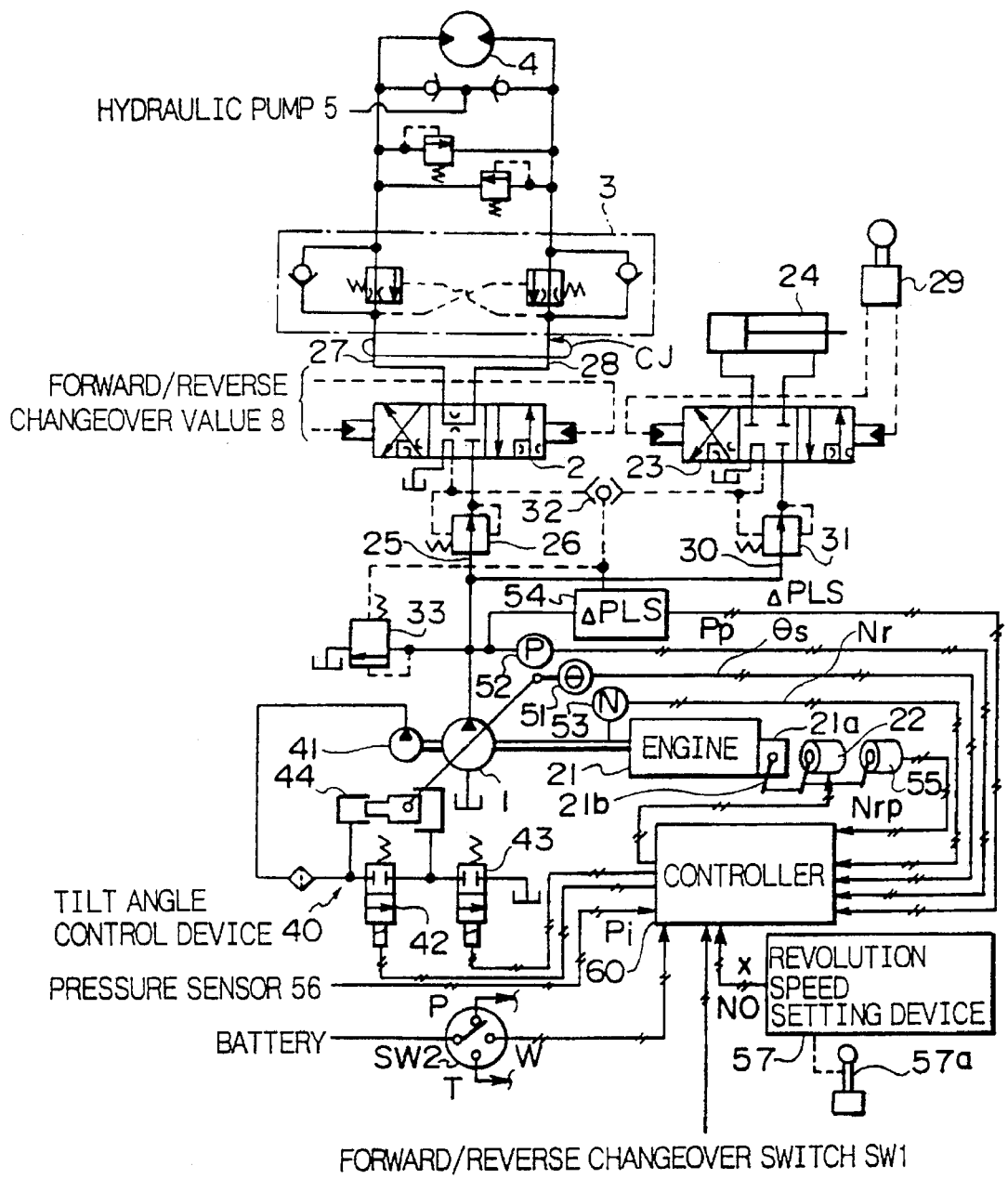
FIG. 3 is an enlarged figure showing a portion of FIG. 2.

FIG. 2 is a figure showing the overall construction of a control device for a wheel type hydraulic shovel, according to the invention, and FIG. 3 is a figure showing an enlarged portion of FIG. 2.

With reference to FIGS. 2 and 3, the revolution speed of the engine 21 is controlled by a governor lever $21b$ of a governor $21a$ that is rotated by a pulse motor 22 according to operation of a fuel lever $57a$ or according to the amount by which a vehicle driving pedal $6a$ is depressed. The details of this control will be explained hereinafter. A variable displacement hydraulic pump 1 is driven by the rotation of the engine 21, and the hydraulic fluid ejected from it is conducted to a hydraulic motor 4 via a control valve for vehicle propulsion 2, a center joint CJ, and a counterbalance valve 3, and also is conducted via a control valve for performing work 23 to a hydraulic cylinder 24 for driving a boom. In this construction, the counterbalance valve 3 and the hydraulic motor for vehicle propulsion 4, which are shown in the figures as higher than the center joint CJ, are disposed in a lower moving body portion of the hydraulic shovel, while the control valve for vehicle propulsion 2, the hydraulic pump 1, and the engine 21, etc., which are shown in the figures as lower than the center joint CJ, are disposed in an upper rotating body portion.

Figure 7A:
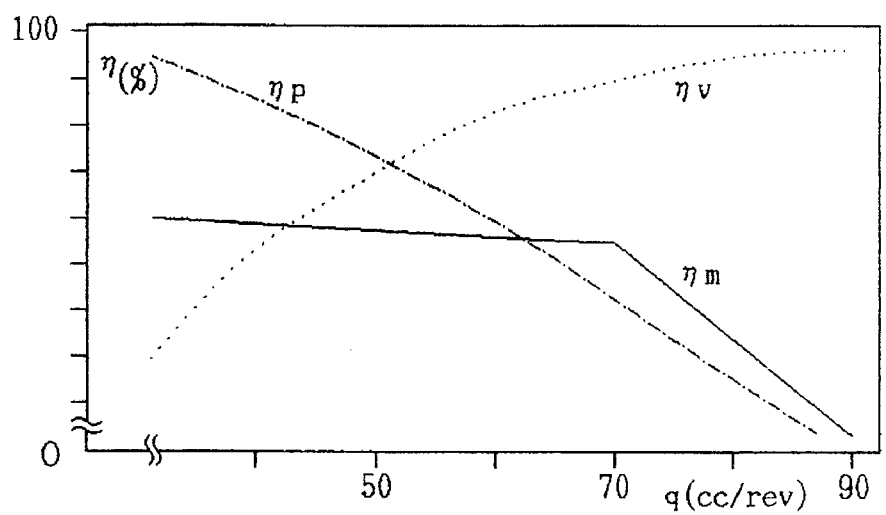
FIG. 7A is a graph showing the motor volumetric efficiency, the motor torque efficiency, and efficiency.
Figure 7B:
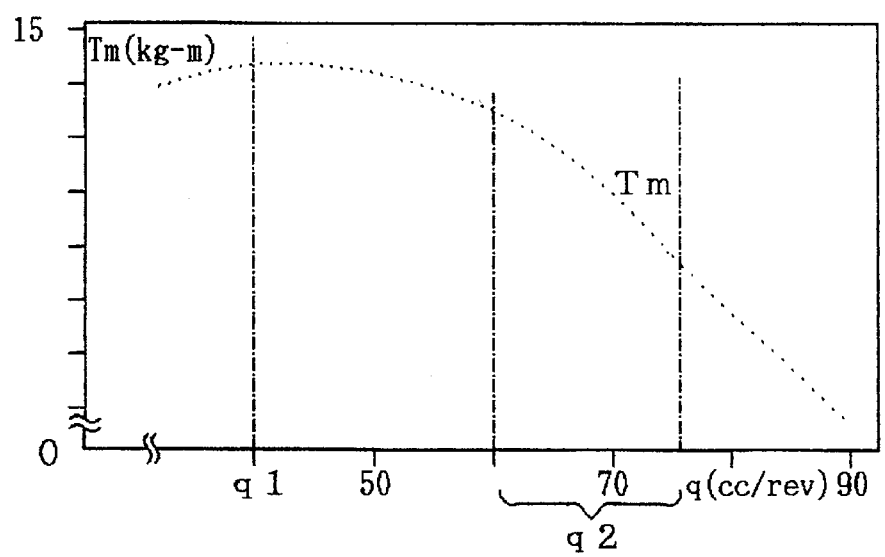
FIG. 7B is a graph showing the relation between the motor displacement and the output torque.

FIG. 7A is a graph displaying volumetric efficiency $\eta v$, torque efficiency $\eta m$, and efficiency $\eta p$ related to hydraulic pressure loss in the vehicle propulsion hydraulic circuit along the vertical axis and motor displacement along the horizontal axis. FIG. 7B is a graph displaying motor displacement along the horizontal axis and output torque of the motor for vehicle propulsion along the vertical axis. The FIG. 7B graph shows the torque line for pump maximum flow amount during vehicle propulsion. Now, if only output torque is considered, with regard to pump output flow amount during vehicle propulsion, the maximum efficiency is attained when the displacement is q1. However, when considering heat balance, the displacement should not be made excessively small. Accordingly one should choose the maximum value for displacement to be q2 in order simultaneously to satisfy the considerations of efficiency and heat balance. With regard to pump output flow amount while performing work, because heat balance does not present as much of a problem, a displacement (>q2) suitable for the highest efficiency should be chosen as its maximum value. If it is possible to provide a large hydraulic fluid cooler, then it is possible to choose the displacement q1 which is best for efficiency also during vehicle propulsion.

As shown in FIG. 2, the control valve for vehicle propulsion 2 is controlled to switch over by a pilot hydraulic pressure supplied from a pilot hydraulic pressure circuit for vehicle propulsion made up of a hydraulic pump 5, a pilot valve 6, a slow return valve 7, and a forward/reverse changeover valve 8. For example, if the forward/reverse changeover valve 8 is shifted to its forward propulsion position (the F position) and the pedal 6a of the pilot valve 6 is operated, along with the engine revolution speed being controlled according to the amount the pedal is depressed, the output pressure from the hydraulic pump 5 is supplied to the pilot port of the pilot type control valve 2 and the control valve 2 is shifted through a stroke amount determined according to the pilot hydraulic pressure. By this, the hydraulic fluid ejected from the variable displacement hydraulic pump 1 is supplied to the hydraulic motor 4 through the conduit 25, the pressure compensation valve 26, the control valve 2, the conduits 27 or 28 and the counter-balance valve 3 and, thereby, the vehicle is propelled. The speed of the vehicle depends upon the amount of depression of the vehicle driving pedal 6a.

Figure 9:
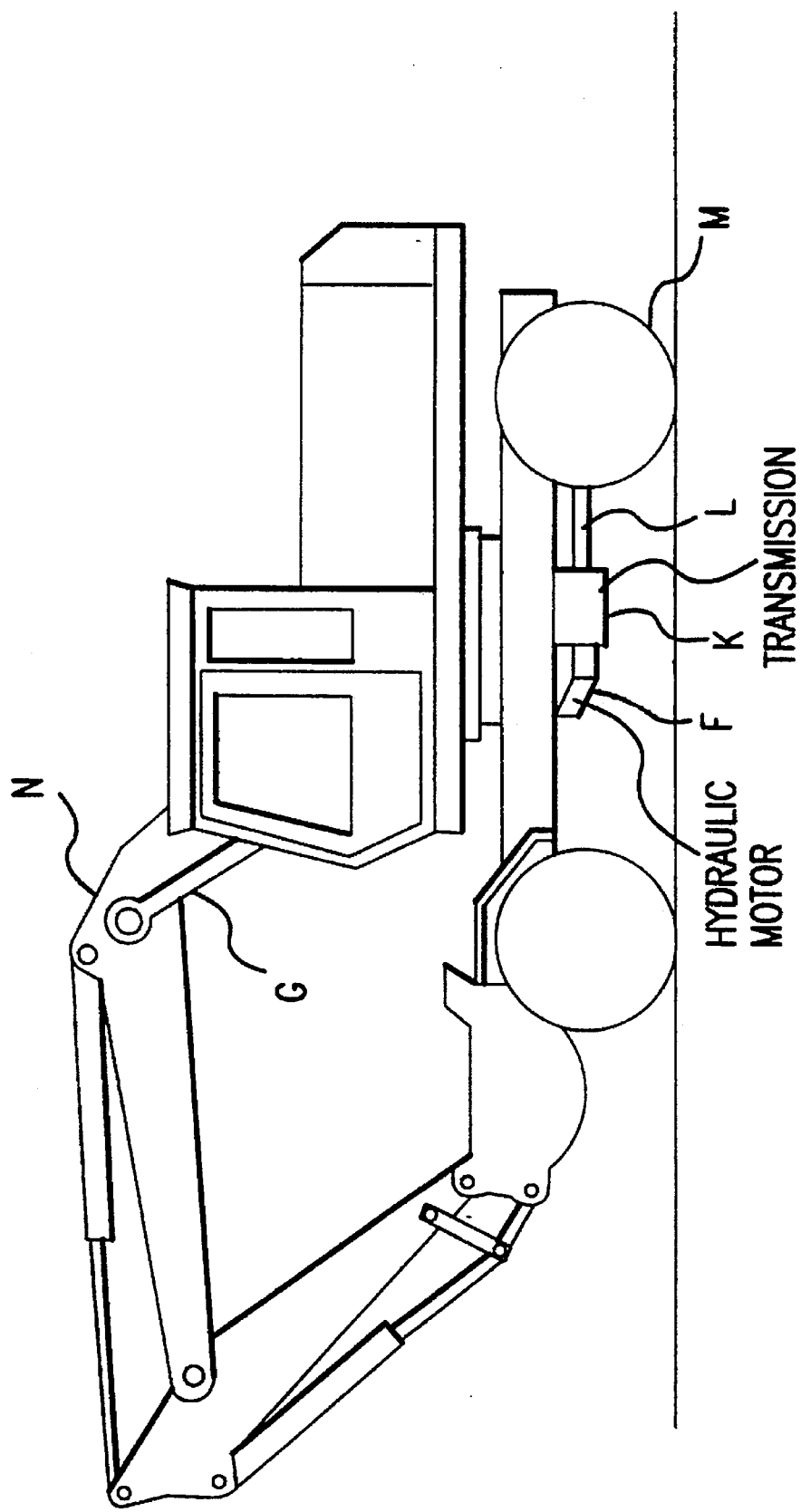
FIG. 9 is a side view of a wheel type hydraulic shovel.
Figure 10:
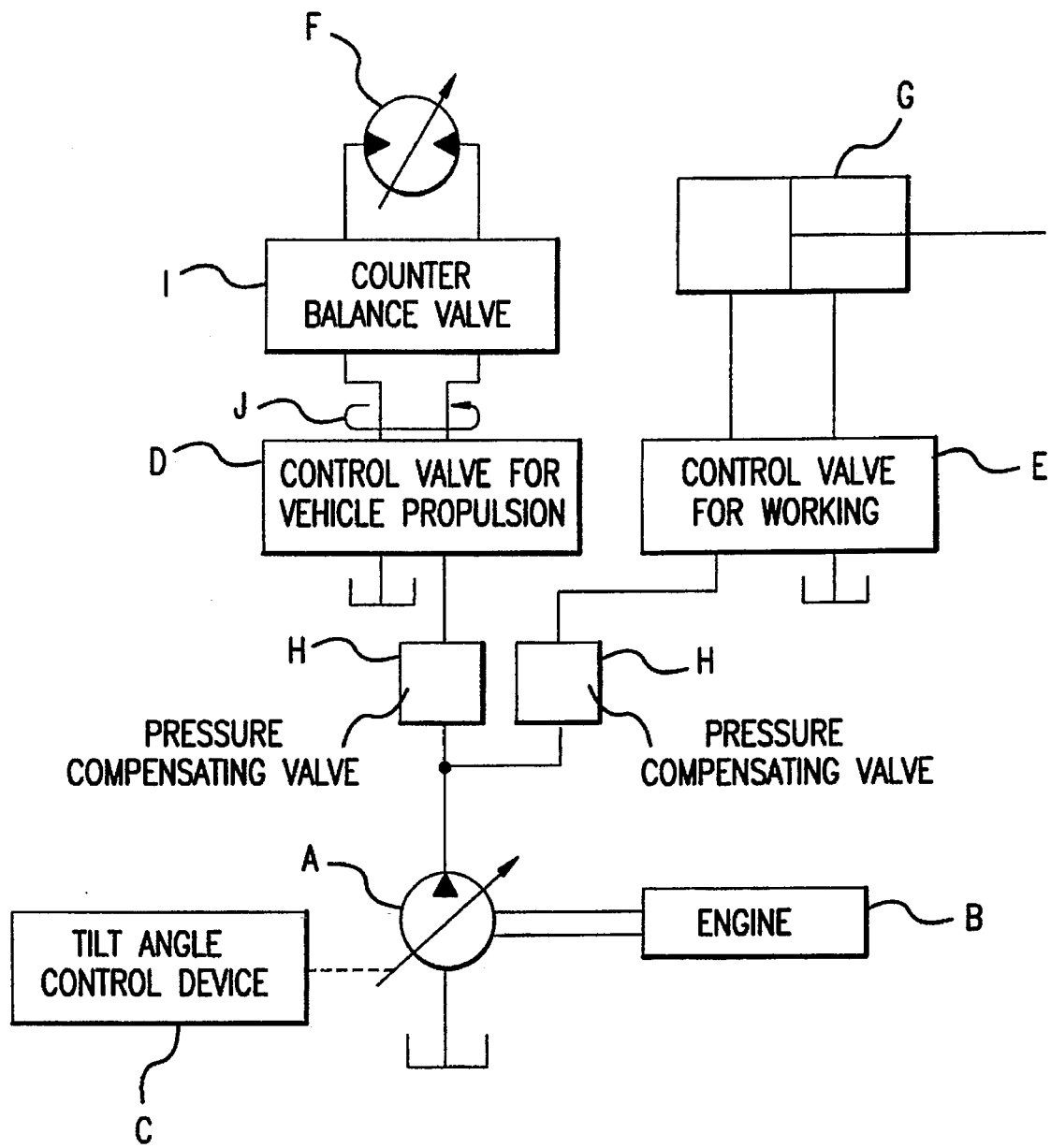
FIG. 10 is a general view of a hydraulic fluid pressurization device for a wheel type hydraulic shovel, which expels pressurized hydraulic fluid, both for vehicle propulsion and for performing work, from a single pump.

A control valve for performing work 23 is shifted by the operation of a pilot valve for performing work 29, and hydraulic fluid ejected from the hydraulic pump 1 is conducted to a hydraulic cylinder for driving a boom 24 via a conduit 30, a pressure compensation valve 31 and the control valve 23. The boom N, shown in FIG. 9, is raised and lowered by the extension and shortening of the hydraulic cylinder 24. In this construction, the pressure compensation valves 26 and 31 are for ensuring that a hydraulic pressure is supplied from the hydraulic pump 1 to each of the hydraulic motor 4 and the hydraulic cylinder 24 which is higher than the corresponding load pressure by just a predetermined amount, so that by this both of the actuators can be operated independently.

The tilt angle of the variable displacement hydraulic pump 1, i.e. the displacement thereof, is controlled by a tilt angle variation device 40. This tilt angle variation device 40 is made up from a hydraulic pump 41 which is driven by the engine 21, a pair of electromagnetic valves 42 and 43, and a servo cylinder 44 the position of the piston of which is controlled by pressurized hydraulic fluid from the hydraulic pump 41 according to the shifting of the electromagnetic valves 42 and 43. The tilt angle of the hydraulic pump 1 is controlled by the position of the piston of the servo cylinder 44. With this construction, the shifting of the pair of electromagnetic valves 42 and 43 is controlled by a controller 60.

The forward/reverse changeover valve 8 is of an electromagnetic type, and, according to a forward/reverse changeover switch SW1 which is provided at the driver's seat of the vehicle being shifted from its N position to its F position or to its R position, said forward/reverse changeover valve 8 is correspondingly shifted from its N position respectively to its F position or to its R position. When this forward/reverse changeover switch SW1 is at its N position, it provides a high level signal as its output. The reference numeral SW2 denotes a brake switch which is shifted to its W position for performing work, while it is shifted to its T position for vehicle propulsion. When the brake switch SW2 is operated so as to be shifted to its W position, then both a parking brake and a service brake, not shown in the figures, are actuated; while on the other hand, when the brake switch SW2 is operated so as to be shifted to its T position, then the parking brake is not actuated and the service brake can be actuated by the operation of a brake pedal. When the brake switch SW2 is at its W position, it provides a high level signal as its output.

The reference numeral 51 denotes a tilt angle sensor which detects the tilt angle θs of the hydraulic pump 1, while 52 is a pressure sensor which detects the output pressure Pp of the hydraulic pump 1, 53 is a revolution speed sensor which detects the revolution speed Nr of the engine 21, and 54 is a pressure difference sensor which detects the pressure difference Δpls between the output pressure of the hydraulic pump 1 and the value of the maximum load pressure of the actuators fed thereby (i.e., the larger one of the load pressure of the hydraulic motor 4 and the load pressure of the hydraulic cylinder 24, the larger pressure being the one selected according to the operation of a shuttle 32). Further, the reference numeral 55 denotes a potentiometer which detects the amount Nrp of rotational movement of the governor 21b, while 56 is a pressure sensor which detects the pressure Pi which is produced by the pilot valve 6 according to the amount by which the vehicle driving pedal 6a is operated. The results output from each of these sensors and the output signals from the above forward/reverse changeover switch SW1 and from the brake switch SW2 are input to the controller 60. The reference numeral 57 denotes a revolution speed setting device on which a target revolution speed value No is commanded, according to the manual operation of the fuel lever 57a, and the command signal therefrom is input to the controller 60.

Figure 4:
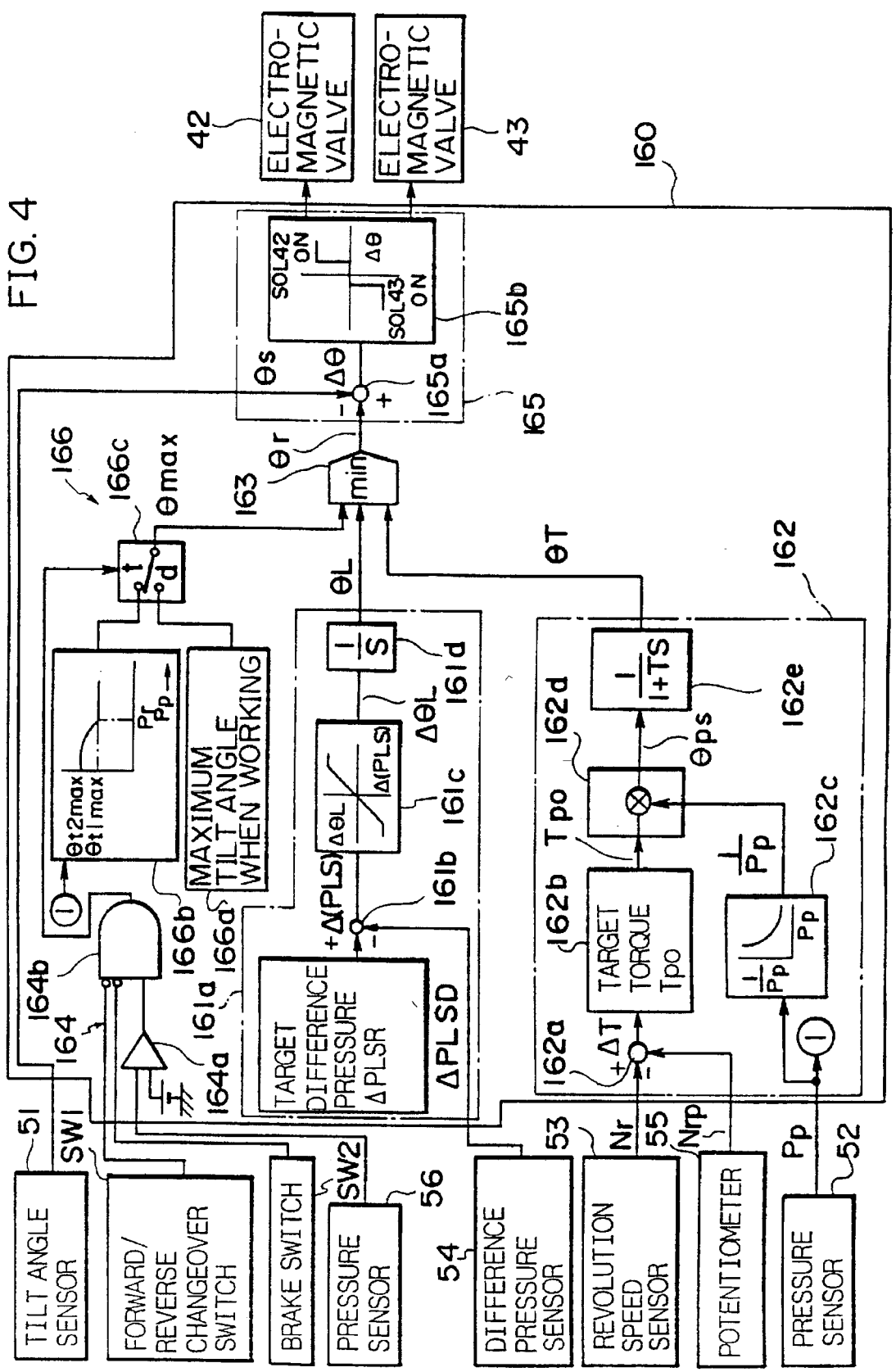
FIG. 4 is a detailed block diagram of a tilt angle control circuit section included in a controller shown in FIG. 2.
Figure 5:
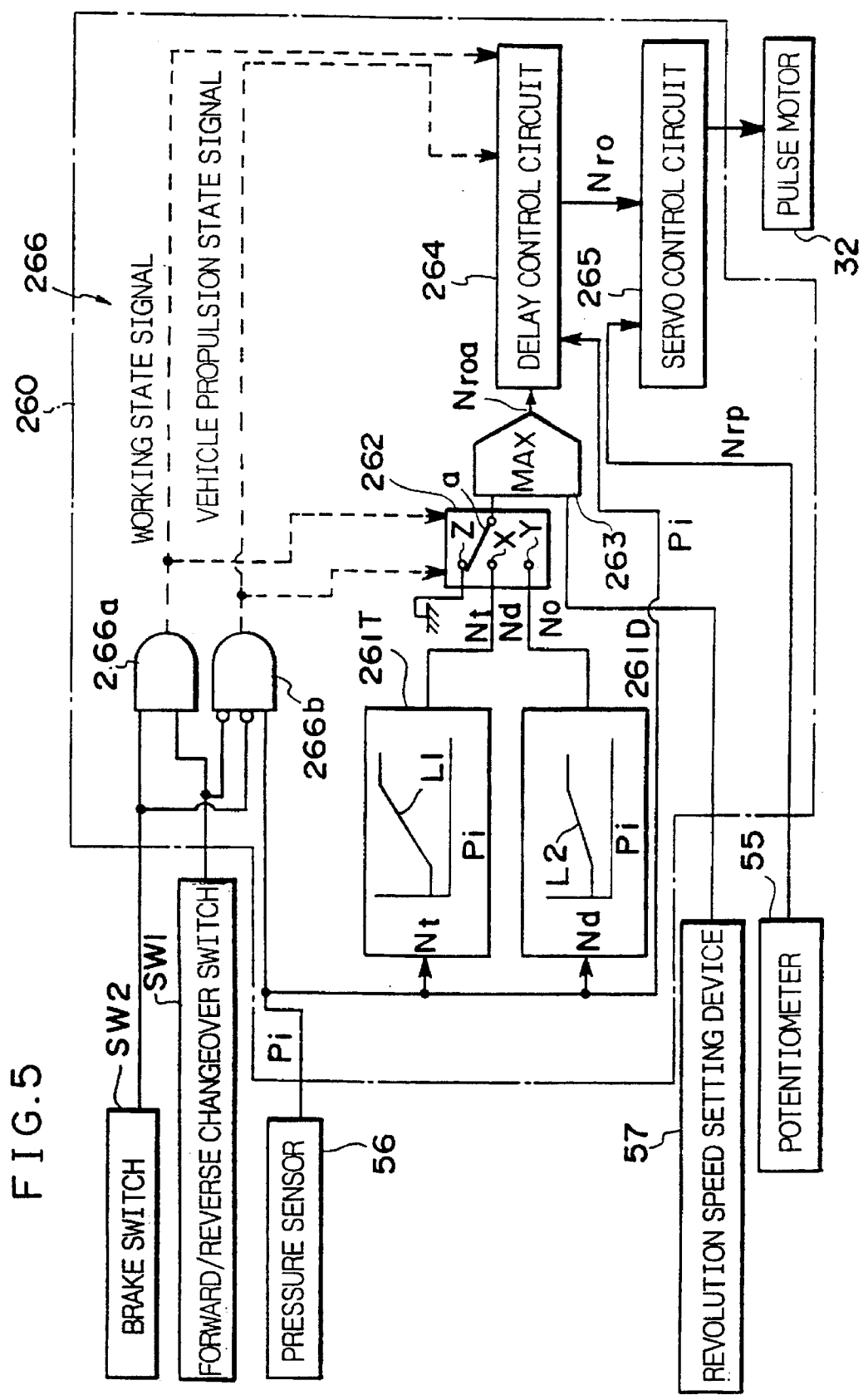
FIG. 5 is a detailed block diagram of an engine revolution speed control device included in a controller shown in FIG. 2.

The controller 60 incorporates a tilt angle control circuit section 160, as shown in FIG. 4, and an engine revolution speed control circuit section 260, shown in FIG. 5. The tilt angle control circuit section 160 is made up from a load sensing control section 161 (hereinafter referred to as the LS control section), a torque control section 162, a minimum value selection section 163, a decision section 164 which is made up from a comparator 164a and an AND gate circuit 164b, a servo control section 165, and a maximum tilt angle setting circuit 166. The engine control circuit section 260 will be described hereinafter.

The LS control section 161 comprises a target pressure difference ΔPLSR setting section 161a, a deviation calculation device 161b which calculates the deviation Δ(PLS) between the pressure difference ΔPLSD detected by the pressure difference sensor 54 and the target pressure difference, a function generating section 161c which calculates the alteration amount ΔθL of the target value based upon this deviation Δ(PLS), and an integrator 161d which integrates this alteration amount ΔθL of the target value and outputs it as a target pump tilt angle θL for load sensing control.

The torque control section 162 comprises a deviation calculation device 162a which calculates the surplus torque ΔT from the deviation between the engine revolution speed Nr as detected by the engine revolution speed sensor 53 and the governor position Nrp as detected by the potentiometer 55. Based upon the deviation ΔT, a target torque Tpo for preventing engine stalling is calculated by a target torque calculation section 162b. Further, the reciprocal of the pump output pressure Pp, as detected by the pressure sensor 52, is calculated by a reciprocal calculating section 162c. In a multiplier 162d this reciprocal and the target torque Tpo are multiplied together to determine θps. The value θps is fed through a linear delay factor filter 162e so as to be output as a target pump tilt angle θT for input torque limit control.

The comparator 164a, incorporated in the decision section 164, is so constructed as to output a high level signal when the pilot pressure Pi as detected by the pressure sensor 56 is higher than a previously set constant pressure value. Its output signal is fed to a non-inverting input terminal of the AND gate circuit 164b. To the two other inverting input terminals of this AND gate circuit 164b there are fed, respectively, the signal from the brake switch SW2 and the signal from the forward/reverse changeover switch SW1. Thus, when:

(1) the brake switch SW2 is at its T terminal or its P terminal (the switch SW2 is outputting a low level signal), and:

(2) the forward/reverse changeover switch SW1 is at a position other than its N position, i.e. is at its F position or at its R position (the switch SW1 is outputting a low level signal), and:

(3) the above described pilot pressure Pi is higher than the predetermined pressure value (the comparator 164a is outputting a high level signal), i.e. during vehicle propulsion, the output of the AND gate circuit 164b is high level and the contact t of a switch 166c, which will be described hereinafter, is connected.

On the other hand, while performing work the output of the AND gate circuit 164b is low level and the contact d of the switch 166c is connected.

The maximum tilt angle setting circuit 166 comprises a tilt angle while performing work setting section 166a on which the previously determined maximum tilt angle θdmax while performing work is set, a maximum tilt angle during propulsion setting section 166b which outputs a maximum tilt angle θtmax during propulsion based upon the pump output pressure Pp, and a selection switch 166c which selects one or the other of the maximum tilt angle while performing work and the maximum tilt angle during propulsion and outputs a limit tilt angle θmax. The maximum tilt angle during propulsion setting section 166b, when the vehicle is being propelled down a slope and the pump pressure Pp becomes less than a fixed value Pr, sets the maximum tilt angle θtmax during propulsion to be the greater, the lower is the pressure.

The minimum value selection section 163 selects the minimum value from the target tilt angles θL and θT and θmax, and outputs it as a commanded tilt angle value θr to the servo control section 165. In the servo control section 165, the deviation Δθ between the commanded tilt angle value θr which was input and the tilt angle feedback value θs which is detected by the tilt angle sensor 51 is calculated in the deviation calculator 165a. Based upon the deviation Δθ, an ON/OFF signal for the electromagnetic valves 42 and 43 is output from the function generation section 165b. In this manner, the tilt angle variation device 40 performs control so as to make the pump tilt angle θs agree with the commanded tilt angle value θr.

Next, the P-Q graph of the variable displacement hydraulic pump 1 in this embodiment will be explained.

With this embodiment, because, along with the target tilt angles θL and θT being output from the load sensing control portion 161 and the torque control section 162 respectively, the maximum tilt angle θmax is output from the maximum tilt angle setting circuit 166. Because the smallest of these values is selected in the minimum value selection section 163, the maximum value of tilt angle is limited to the maximum tilt angle θmax. Now, as will be described hereinafter, although the maximum engine revolution speed during vehicle propulsion is arranged to be higher than the maximum engine revolution speed while performing work, nevertheless in order that the maximum pump output flow amount Qt1max during vehicle propulsion on level ground (pressure less than Pr) becomes in fact smaller than the maximum pump output flow amount Qdmax while performing work, the maximum tilt angle θt1max during vehicle propulsion on level ground is set to be lower than the maximum tilt angle θdmax while performing work. By this type of setting, the P-Q graph shown in FIG. 1A is obtained. In FIG. 1A, T is the P-Q graph during vehicle propulsion, while D is the P-Q graph while performing work. Now, because it is arranged that the maximum tilt angle θt2max when the vehicle is being propelled down a slope (the vehicle propulsion pressure less than Pr) is greater than the maximum tilt angle θt1max during vehicle propulsion on level ground, therefore, as shown in FIG. 1A, the maximum pump output flow amount Qtmax when the pressure is less than Pr shows a tendency to be somewhat increased from Qt1max in the direction of Qt2max.

FIG. 5 is a general view for explanation of the engine revolution speed control circuit portion 260 included in the above described controller 60 shown in FIG. 2.

The engine revolution speed control circuit portion 260 comprises two function generators 261T and 261D, a selection switch 262, a maximum value selection circuit 263, a delay control circuit 264, a servo control circuit 265, and a decision circuit 266 comprising AND gates 266a and 266b.

A signal representing the pilot pressure Pi detected by the pressure sensor 56 (also representing the amount θp by which the vehicle driving pedal is depressed) is input to the function generators 261T and 261D and the delay control circuit 264. The function generators 261T and 261D output revolution speeds Nt and Nd determined according to functions (revolution speed characteristics) L1 and L2 for the target revolution speed for the engine 21 as corresponding to the pilot pressure Pi. The function L1 is a vehicle propulsion revolution speed characteristic suitable for application during vehicle propulsion, while the function L2 is a working revolution speed characteristic Suitable for application when performing work. With the function L1, the rise in revolution speed is steeper than with the function L2 and also the maximum revolution speed is set to be higher. Thus during performing work it is possible to control the engine revolution speed with the vehicle driving pedal 6a according to a revolution speed characteristic which is appropriate for performing work, while during vehicle propulsion it is possible to control the engine revolution speed with the vehicle driving pedal 6a according to a revolution speed characteristic which is appropriate for vehicle propulsion.

The selection switch 262 comprises a fixed contact X which is connected to the function generator 261T which outputs the revolution speed Nt according to the revolution speed characteristic L1 for use during vehicle propulsion, another fixed contact Y which is connected to the function generator 261D which outputs the revolution speed Nd according to the revolution speed characteristic L2 suitable for performing work, and a fixed ground contact Z which is connected to ground. When the fixed contact Z is connected, a revolution speed signal is selected which represents a low revolution speed lower even than idling speed. The switching over of this selection switch 262 is performed by signals from the AND gate 266a and from the AND gate 266b.

The non-inverted input terminals of the AND gate 266a are connected to the W contact of the brake switch SW2 and to the neutral contact N of the forward/reverse changeover switch SW1. Further, the inverted input terminals of the AND gate 266b are respectively connected to the W contact of the brake switch SW2 and to the neutral N contact of the forward/reverse changeover switch SW1, and its non-inverted input terminal is connected to the pressure sensor 56. As has been described above, when the brake switch SW2 is switched to its W position, its W contact goes high level, while in its T or P position its W contact goes low level. When the forward/reverse changeover switch SW1 is switched to its neutral N position, its neutral N contact goes high level, while in its F or its R position its N contact goes low level. When the vehicle driving pedal 6a is depressed, the signal from the pressure sensor 56 goes high level. Accordingly, the vehicle propulsion signal Output by the AND gate circuit 266b goes high level during actual vehicle propulsion and the X terminal of the switch 262 is connected, while performing work the working signal output by the AND gate circuit 266a goes high level and the Y terminal of the switch 262 is connected.

According to the switched position of the selection switch 262, either the engine revolution speed signal from one or the other of the function generators 262T and 262D or the low revolution speed signal from the fixed contact Z is selected and is input to the maximum value selection circuit 263. To the other input terminal of this maximum value selection circuit 263 there is also supplied the revolution speed No from the revolution speed setting device 57; and whichever of these is the greater is input to the delay control circuit 264 as the target revolution speed Nroa. The maximum value of the revolution speed ordered on the revolution speed setting device 57 is limited to the maximum revolution speed of the revolution speed characteristic L2 suitable for performing work. The output signals from the AND gates 266a and 266b showing whether the current vehicle operational condition is the propulsion condition or the working condition, and the pilot pressure Pi showing the amount by which the vehicle driving pedal is depressed, are input to the delay control circuit 264. The delay control circuit 264 calculates the target value Nro for the governor lever position and inputs it to the servo control circuit 265. The current value of engine revolution speed, i.e. the value of the detected position Nrp of the governor lever, is also input to the servo control circuit 265 from the above described potentiometer 55, and this servo control circuit 265 performs control according to the procedure shown in FIG. 6 to change the engine revolution speed to the target governor lever position value Nro. In other words, by the operation of both the circuits 264 and 265, slowdown control is performed only when the vehicle speed is decreasing, and in other circumstances normal revolution speed control is performed according to the amount by which the vehicle driving pedal is depressed. The slowdown control is a type of engine revolution speed control in which, during deceleration operation when the amount by which the vehicle driving pedal is depressed is decreasing, the engine revolution speed is reduced more slowly than the speed of the decrease in the amount by which the pedal is depressed.

Figure 6:
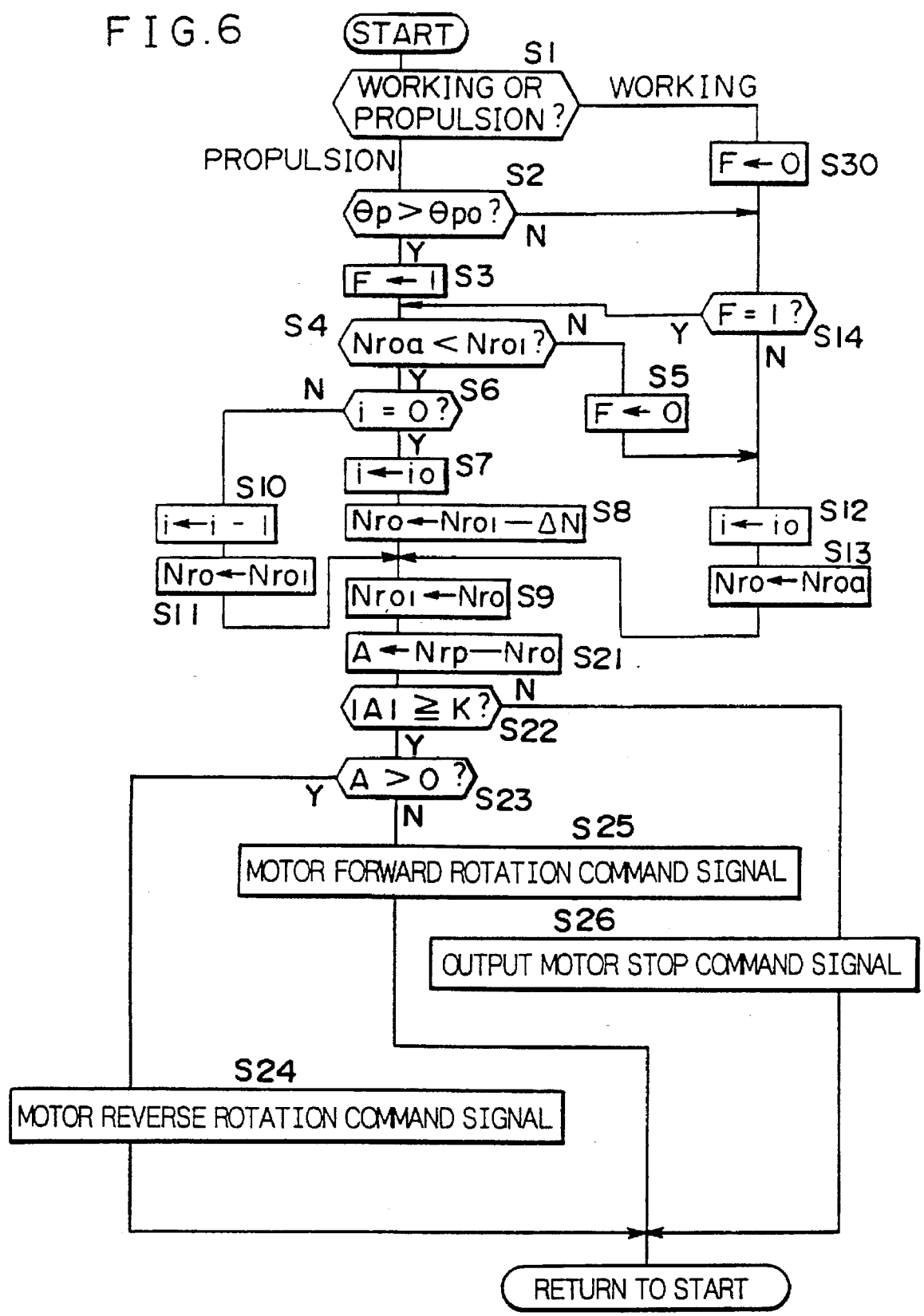
FIG. 6 is a flow chart for the case when a delay control circuit and a servo control circuit of FIG. 5 are realized by a program.

FIG. 6 shows the control process when the delay control circuit 264 and the servo control circuit 265 are realized as a program. In the initial decision step S1, based upon the signals from the AND gates 266a and 266b, a decision is made as to whether the current vehicle operational state is the propulsion condition or the working condition. It is decided that the current vehicle operational condition is the working condition if the output signal from the AND gate 266a is high level, while it is decided that the current vehicle operational condition is the propulsion condition if the output signal from the AND gate 266b is high level. If the decision is made that the current vehicle condition is the propulsion condition, then the flow of control proceeds next to the decision step S2. When it is decided in the step S2 that the angle θp by which the pedal 6a is being depressed is greater than or equal to a fixed angle θpo, in the step S3 a speed reduction flag F is set to 1 and the flow of control proceeds to the decision step S4, in which a decision is made as to whether or not the current target revolution speed Nroa is less than its value Nro1 the previous time the control procedure was executed. The meaning at this point of Nroa being less than Nro1 is that the vehicle driving pedal is being operated in the direction of speed reduction, i.e. that a command is being given for speed reduction.

If the decision in the step S4 is NO, i.e. if it is decided that the vehicle driving pedal is not being operated in the direction of speed reduction, then in the step S5 the speed reduction flag F is set to 0, and the flow of control passes next to the step S12 to be described hereinafter. If the decision in the step S4 is YES, i.e. if it is decided that the vehicle driving pedal is being operated in the direction of speed reduction, then the flow of control passes next to the decision step S6, in which a decision is made as to whether or not the value of a variable i is equal to zero. This variable i is for showing how many times this control loop of FIG. 6 has been repeated. Because the speed reduction flag F which was set to 1 in the step S3 is set to zero in the step S5 which comes after a NO decision in the decision step S4, therefore the meaning of this flag F being equal to 1 is that speed reduction is currently being performed.

If a YES decision is made in the step S6, next in the step S7 a determinate value io (with io>0) is loaded into the variable i, and the flow of control proceeds to the step S8 in which Nro is set to Nro1−ΔN. The flow of control proceeds to the step S9. In this step S9 the present value of Nro is loaded into Nro1 and the flow of control proceeds to the step S21. On the other hand, if in the decision step S6 a NO decision is made, then in the step S10 the value of the variable i is decremented by 1, in the next step S11 Nro is replaced by Nro1, and next the flow of control proceeds to the step S9.

However, if in the decision step S2 a NO decision is made, then in the decision step S14 a decision is made as to whether or not the speed reduction flag F is equal to 1. If the decision is YES, then next the flow of control proceeds to the step S4. On the other hand, if the decision is NO, then in the step S12 the constant value io is loaded into the variable i, and next the flow of control proceeds to the step S13, in which Nroa is loaded into Nro. Thereafter the flow of control proceeds to the step S9.

In the step S21, the difference Nrp Nro between the present governor lever position and the governor lever target value corresponding to the target revolution speed is determined, and the result is stored in the memory as a revolution speed difference A. In the step S22 a decision is made whether the absolute value of the result A is greater than or equal to a previously determined standard revolution speed difference K. If in the decision step S22 the result of the decision is YES, then the flow of control proceeds next to the decision step S23, in which a decision is made whether the revolution speed difference A is greater than zero. An affirmative result of this decision means that the present controlled revolution speed is greater than the target revolution speed Nro. Thus, in the step S24 a signal is output to the pulse motor 22 to order it to rotate in the reverse direction by just the proper amount required to reduce the engine revolution speed from its present value by the previously determined revolution speed unit ΔN. This causes the pulse motor 22 to rotate in the reverse direction, and thereby the revolution speed of the engine 21 is reduced by just the amount ΔN. In this way, the maximum value ΔN for the above described revolution speed unit is the maximum revolution speed amount which can be incremented or decremented while one cycle through this program loop is executed.

On the other hand, a negative judgement in the decision step S23 means that the controlled revolution speed is lower than the target revolution speed Nro. Thus in the step S25 a signal is output to the pulse motor 22 to order it to rotate in the forward direction by just the proper amount required to increase the engine revolution speed from its present value by the above described revolution speed unit $\Delta N$. This causes the pulse motor 22 to rotate in the forward direction, and thereby the revolution speed of the engine 21 is increased by just the amount $\Delta N$. On the other hand, if in the decision step S22 the result of the decision is NO, then the flow of control proceeds next to the step S26, in which a motor stop signal is output, and thereby the revolution speed of the engine 21 is maintained at a constant value. After executing one or the other of the steps S24 through S26, the flow of control next returns back to the beginning of the program loop.

The above explained steps S1 through S14 represent the processing procedure of the delay control circuit 264. The step S21 and the following represent the processing procedure of the servo control circuit 265.

Next, the operation of this embodiment constituted as described above will be explained.

Referring to FIG. 4, while performing work, because the brake switch SW2 is positioned at its W terminal, and moreover the forward/reverse changeover switch SW1 is set to its N position (the neutral position), thereby the output of the AND gate circuit 164b of the decision section 164 provided in the tilt angle control circuit section 160 is low level. Accordingly, the selection switch 166c selects the maximum tilt angle $\theta dmax$ suitable for performing work, and the tilt angle of the hydraulic pump 1 is limited by $\theta dmax$ (which is greater than $\theta tmax$). On the other hand, during vehicle propulsion, because the brake switch SW2 is switched over to its T terminal and moreover the forward/reverse changeover switch SW1 is switched over to a one of its positions other than its N terminal, i.e. to its F position or to its R position, then, when the vehicle driving pedal is depressed and its pilot pressure becomes greater than the predetermined value, the output of the AND gate circuit 164b goes high level. Due to this, the selection switch 166c selects the maximum tilt angle $\theta tmax$ suitable for vehicle propulsion, and the tilt angle of the hydraulic pump 1 is limited by $\theta tmax$.

Both while performing work and during vehicle propulsion the engine revolution speed is controlled as will now be described. With the maximum revolution speed during vehicle propulsion being set higher than the maximum revolution speed while performing work, the necessary power for vehicle propulsion is assured.

Referring to FIG. 5, at the start of performing work the brake switch SW2 is shifted to its W position and, as described above, the main brake device and the parking brake device which are not shown in the figures are both operated to apply working braking. At this time, the forward/reverse changeover switch SW1 is set to its neutral position N, and the output of the AND gate 266a is high level, so that the selection switch 262 is switched over to its Y contact. As a result, the revolution speed characteristic L2 for use while performing work set in the function generator 261D is selected. On the other hand, in the situation in which along with the brake switch SW2 being switched over to its T position or to its P position the forward/reverse changeover switch SW1 is switched over to its forward propulsion position F or to its reverse propulsion position R, then when the pressure Pi is generated the output of the AND gate 266b goes high level, so that the selection switch 262 is switched over to its X contact. As a result, the revolution speed characteristic L1 for use during vehicle propulsion set in the function generator 261T is selected.

In any other situation than the two described above, the selection switch 262 is switched over to its Z contact, and the signal which represents a revolution speed lower than idling speed is selected. The revolution speed thus selected is input to the maximum value selection circuit 263 and is compared with the revolution speed No set on the revolution speed setting device 57. The one of them which is the greater is selected as the target revolution speed Nroa. This target revolution speed Nroa is input to the delay control circuit 264 and the target revolution speed Nro is calculated; and input to the servo control circuit 265. And, according to the procedure shown in FIG. 6, slowdown control is only performed for speed reduction during vehicle propulsion. In other circumstances normal engine revolution speed control is performed.

Figure 8:
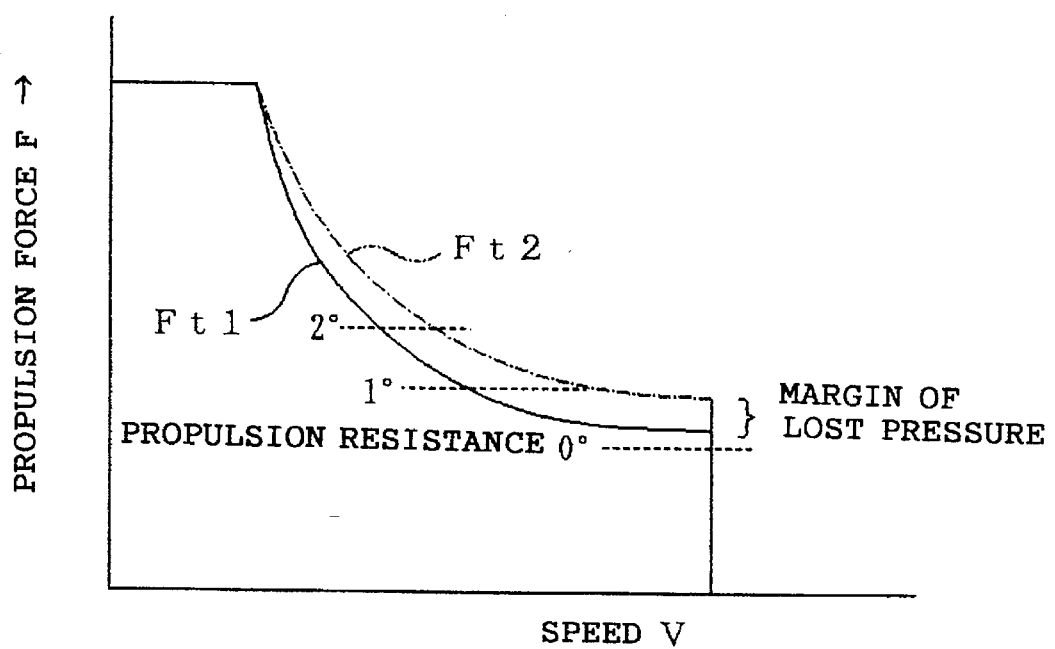
FIG. 8 is a graph showing variation of the propulsion force as related to variation of the displacement.

Accordingly, during vehicle propulsion on level ground at a fixed speed in the pressure region where the vehicle propulsion pressure is greater than Pr, the maximum flow amount from the hydraulic pump 1 during vehicle propulsion is Qt1max as can be ascertained from FIG. 1A, while performing work it is Qdmax (which is greater than Qt1max) and the pressure loss during vehicle propulsion is diminished as compared with the prior art. Further, even though the displacement of the hydraulic motor is reduced by just the amount that the flow amount of the pump is diminished, it is possible to obtain the desired maximum speed so that the efficiency, including the motor volumetric efficiency, the torque efficiency, and the pressure loss as well, can be increased. Not only it is possible to obtain a desired torque for vehicle propulsion although the displacement of the hydraulic motor is reduced, but also the specific fuel comsumption during vehicle propulsion along level ground is improved. Yet further, by reduction of the displacement of the hydraulic motor (for example from 90 cc to 70 cc), as shown in FIG. 8, the characteristic of the propulsion force with relation to the speed V is elevated from the curve Ft1 to the curve Ft2, and the propulsion force can be made proportionally larger in correspondence to the proportional improvement in pressure loss. Thus the vehicle speed, when it is being propelled up a slope, is improved. And, yet further, because when the vehicle is being propelled down a slope, the pump pressure Pp is lower than the predetermined pressure value Pr, and the maximum tilt angle $\theta t2max$ for vehicle propulsion becomes greater the less the pump pressure Pp becomes, the maximum flow amount Qt2max of the pump is increased as shown in FIG. 1A so as to be higher than that during vehicle propulsion on level ground, whereby the maximum speed when the vehicle is being propelled down a slope can be faster than during vehicle propulsion on level ground. As shown by the broken double dotted line Tx in FIG. 1A, the operational benefit of the invention is identical to that described above, even if the maximum flow amount Qt3max of the pump when the vehicle is being propelled down a slope exceeds the maximum flow amount Qdmax of the pump when performing work.

That is to say, when during vehicle propulsion the vehicle driving pedal 6a is operated in the direction to accelerate the vehicle, in the step S4 a NO decision is reached, and then in the step S13, because the value Nroa selected by the selection switch 262 is set as the value of the target revolution speed Nro, the engine revolution speed quickly increases according to the operation of the vehicle driving pedal 6a. On the other hand, when during vehicle movement the vehicle driving pedal 6a is operated in the direction to decelerate the vehicle, in the step S4 a YES decision is reached, and only when i=0 is the target revolution speed Nro set (in the step S8) to its value Nro1 the time round before decremented by ΔN (the revolution speed unit). The variable i is progressively decremented by one each time the step S10 is passed through, so that the step S8 is executed just once each time that the FIG. 6 control loop is repeated a predetermined number of times. Accordingly, the engine revolution speed is decreased in proportion to the passage of time.

Further, if in the step S1 a decision is made that work is being performed, then, the engine revolution speed is controlled by the loop including the steps S12, S13, S9, and the steps S21 through S26. Therefore even when the vehicle driving pedal 6a depression amount for vehicle movement is diminished, slowdown control is not performed, but instead normal engine revolution speed control is executed. Thus, the operational feeling is improved when controlling the engine revolution speed with the vehicle driving pedal while performing work.

With regard to the characteristic for the maximum tilt angle during propulsion setting section 166b, with the above described embodiment, the maximum tilt angle when the vehicle is being propelled down a slope is made greater in relation to pump pressure so that the vehicle speed when being propelled down a slope is made greater as compared to the vehicle speed during propulsion on level ground. However, as an alternative, it would also be acceptable to set the maximum vehicle speed when being propelled down a slope to be the same as the maximum vehicle speed during vehicle propulsion on level ground by setting the maximum tilt angle, both during vehicle propulsion on level ground and while it is being propelled down a slope, in the same way. Further, although in the above described embodiment the condition that the vehicle is being propelled down a slope is detected from the pressure of the pump, as an alternative it would also be acceptable for such detection to be performed from other phenomena characteristic of the vehicle thus being propelled down a slope.

Now, although as described above, the amount of operation of the vehicle driving pedal 6a was detected by the use of a pilot pressure sensor 56, it would also be acceptable, for example, to detect the amount of operation by fixing a potentiometer or the like directly to the vehicle driving pedal 6a. Detection of the various other types of information is also not to be considered as limited to the methods described above. Further, the construction of the controller also is not limited to that described above. Again, although with the above the construction was such that a single forward/reverse changeover valve 8 was used which could take any one of three positions, it would also be acceptable for the construction to include two valves: a forward/reverse changeover valve which had two positions, and an opening and closing valve. Yet further, although with the above construction the vehicle propulsion state was recognized according to switching of the brake switch SW2 to any position other than its W position, according to switching over of the forward/reverse changeover switch to any position other than its N position, and according to operation of the vehicle driving pedal, it would also be acceptable to recognize the vehicle movement state only according to the condition of the brake switch, or alternatively only according to the condition of the forward/reverse changeover switch. Recognizing the working state according to detection of the actual operation of the parking brake device and the main brake device, or discriminating between the vehicle movement state and the working state from the actual position of the forward/reverse changeover valve 8 would also be acceptable. And furthermore, although the above explanations have all been made in terms of a wheel type hydraulic shovel, the present invention can also be applied in the same way to other types of hydraulically propelled vehicle.

Figure 11:
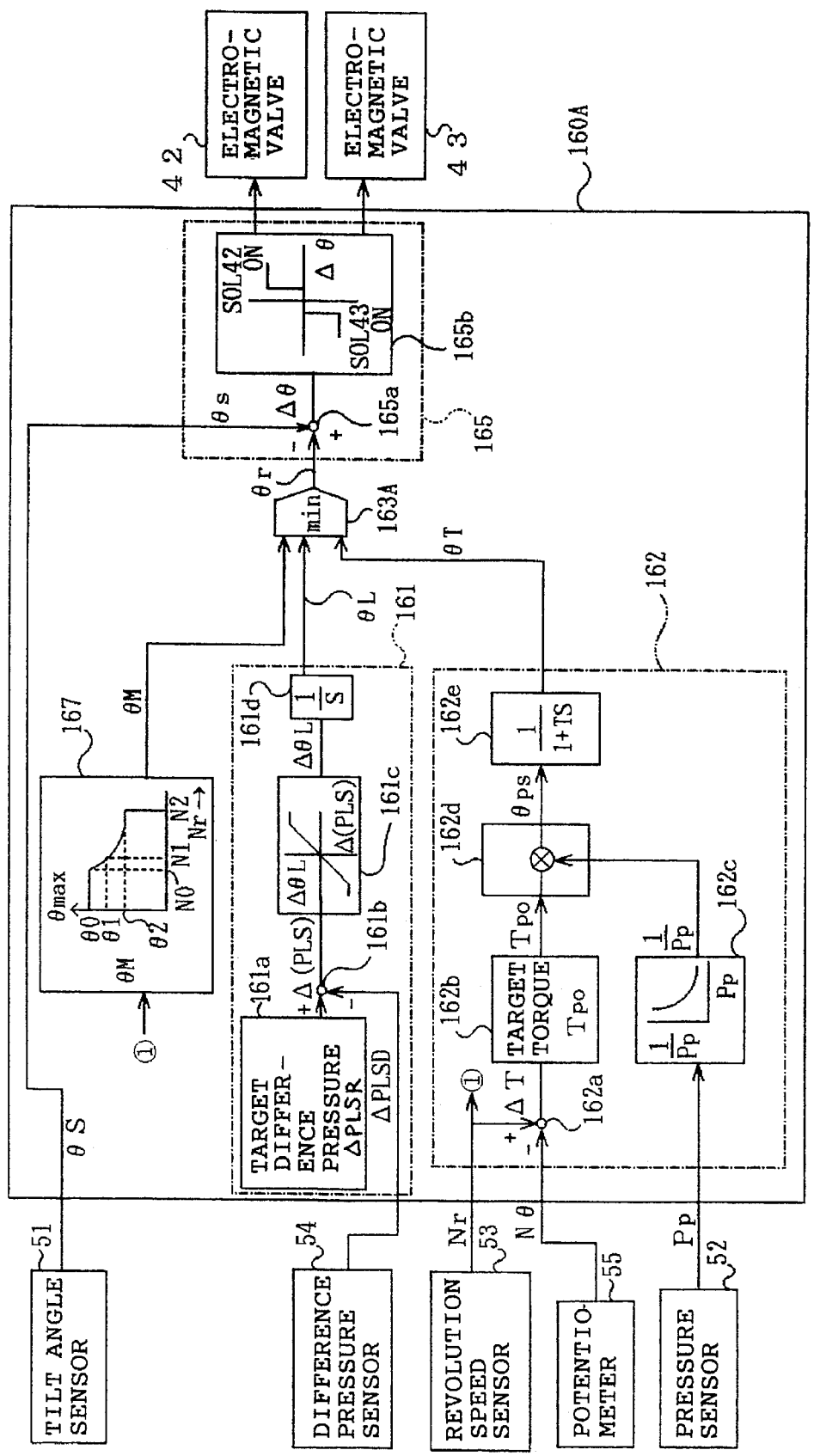
FIG. 11 is a block diagram showing the details of another embodiment of the tilt angle control circuit section.
Figure 12:
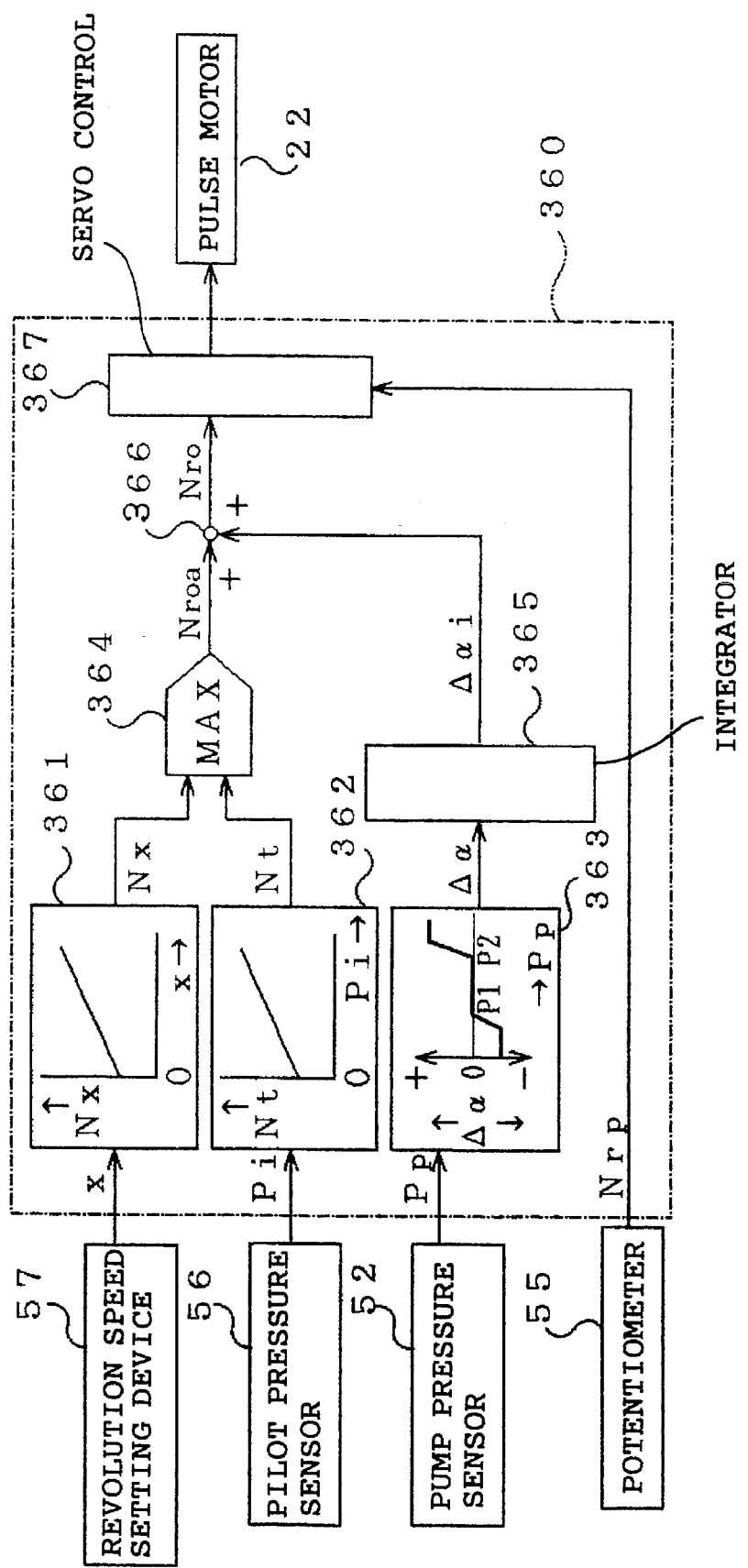
FIG. 12 is a block diagram showing the details of another embodiment of the engine revolution speed control circuit section.

The controller 60 of the second embodiment comprises a tilt angle control circuit section 160A as shown in FIG. 11 and an engine revolution speed control circuit section 360 as shown in FIG. 12. The tilt angle control circuit section 160A is composed of a load sensing control section 161 (hereinafter referred to as the LS control section), a torque control section 162, a minimum value selection section 163A, a maximum tilt angle setting section 167, and a servo control section 165. The LS control section 161, the torque control section 162, and the servo control section 165 are the same as those of the first embodiment, and accordingly the description of these elements will be curtailed. The engine revolution speed control circuit section 360 will be described hereinafter.

The maximum tilt angle setting section 167 is constructed so as to output the maximum tilt angle $\theta M$ based upon the engine revolution speed Nr which it receives as input from the engine revolution speed sensor 53, and it calculates $\theta M$ from the equation $\theta M=(\theta 1 \times N1)/Nr$ in order to obtain the standard flow amount Qtmax relating to the maximum revolution speed N1 during vehicle propulsion on level ground and the pump tilt angle $\theta 1$ in any revolution speed ranges.

Thus, until the engine revolution speed Nr reaches a predetermined value N0 (for example idling revolution speed), the maximum value $\theta max$ is output as the maximum tilt angle $\theta M$. In the region in which the engine revolution speed Nr exceeds the predetermined value N0, a maximum tilt angle $\theta M$ is output which becomes smaller as the engine revolution speed Nr increases.

The minimum value selection section 163A selects the least value from the target pump angle $\theta L$, $\theta T$, and $\theta M$ and outputs it to the servo control section 165 as the commanded tilt angle value $\theta r$.

FIG. 12 is a general view for detailed explanation of the engine revolution speed control circuit section 360 included in the controller 60.

The engine revolution speed control circuit section 360 comprises three function generators 361 through 363, a maximum value selection circuit 364, an integrator 365, an adder 366, and a servo control circuit 367.

The function generator 361 outputs a target revolution speed Nx based upon the amount x of operation of the fuel lever 57a as commanded from the revolution speed setting device 57. The function generator 362 outputs a target revolution speed Nt based upon the pilot pressure Pi detected by the pressure sensor 56. The function generators 361 and 362 output target revolution speeds which are almost proportional to their input signals. The function generator 363 outputs a revolution speed correction $\Delta\alpha$ based upon the pump pressure Pp as detected by the pump pressure sensor 52. If the pump pressure Pp is in a predetermined range less than P1, this function generator 363 outputs a negative revolution speed correction $-\Delta\alpha$ proportional to the pump pressure Pp. In the range from P1 to P2 the revolution speed correction $\Delta\alpha$ is zero, while in the range greater than P2 the function generator 363 outputs a positive revolution speed correction $+\Delta\alpha$ proportional to the pump pressure Pp. Here, the range less than P1 means that the vehicle is being propelled down a slope, the range from P1 to P2 means that the vehicle is being propelled along level ground, and the range greater than P2 means that the vehicle is being propelled up a slope.

The maximum value selection circuit 364 selects the maximum value from the target revolution speed Nx and Nt, and inputs it to the adder 366 as the target revolution speed Nroa. The integrator 365 integrates the revolution speed correction Δα and inputs it to the adder 366 as Δαi. The adder 366 adds together the target revolution speed Nroa and the integrated revolution speed correction Δαi, and inputs it to the servo control circuit 367 as a governor lever position target value Nro. The current engine revolution speed from the above described potentiometer 55, i.e. the detected value Nrp of governor lever position, is also inputted to the servo control circuit 367, and control is performed according to the procedure shown in FIG. 13 to change the engine revolution speed to the governor lever position target value Nro.

Figure 13:
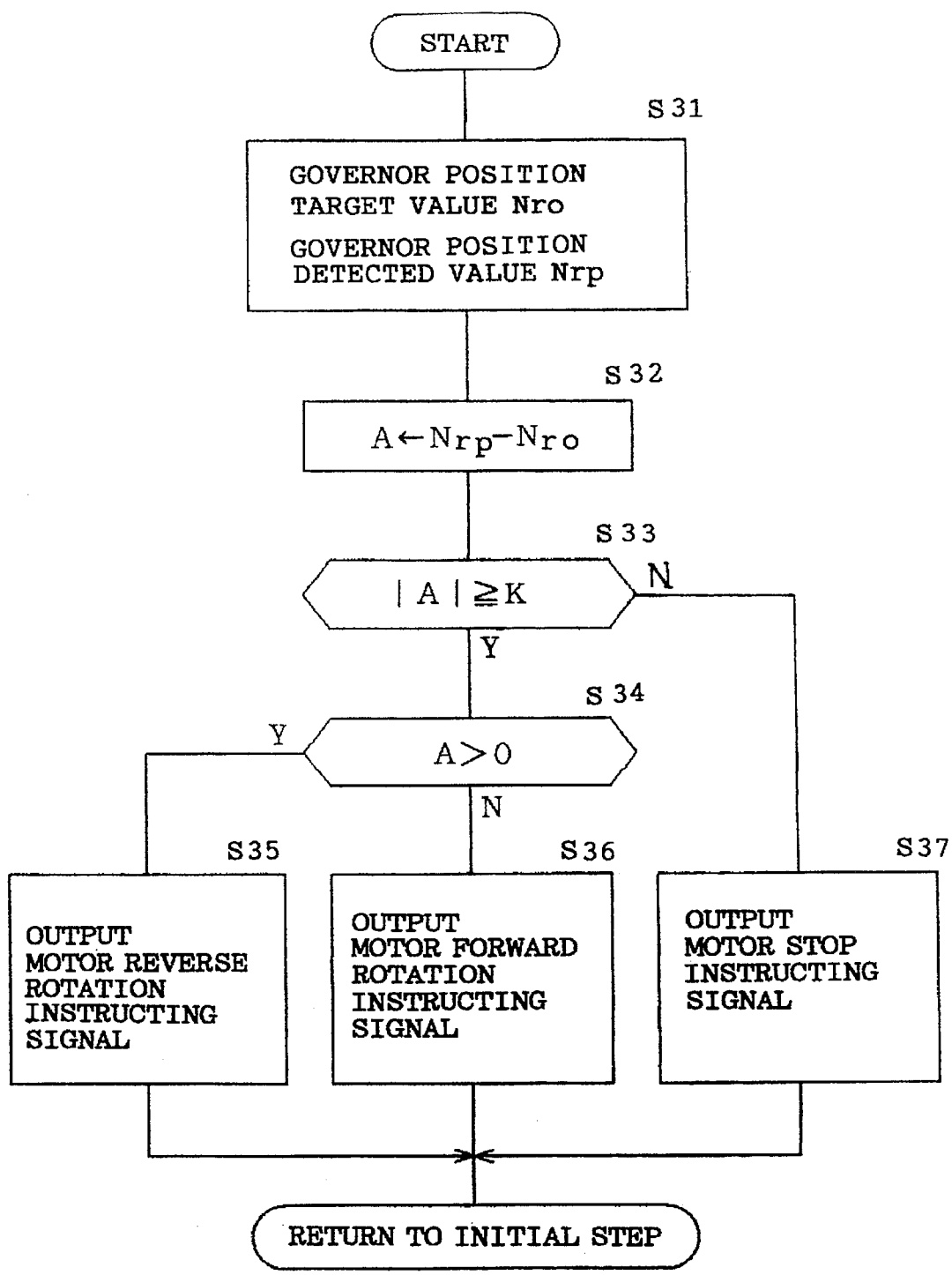
FIG. 13 is a flow chart for the case when a servo control circuit of FIG. 12 is realized by a program.

FIG. 13 shows the control process when the servo control circuit 367 is realized as a program. In the step S31, the target value Nro for governor lever position and the detected value Nrp of governor lever position are read in. Next, in the step S32, the difference Nrp Nro between the present governor lever position and the governor lever position target value (which represents the target engine revolution speed) is calculated, and the result is stored in the memory as a revolution speed difference A. Subsequently in the decision step S33 a decision is made whether the absolute value of the revolution speed difference A is greater than or equal to a previously determined standard revolution speed difference K. If the result of the decision in this step S33 is YES, then the flow of control proceeds next to the decision step S34, in which a decision is made as to whether the revolution speed difference A is greater than zero. Since the affirmative result of this decision means that the present controlled engine revolution speed is higher than the target revolution speed Nro, in the step S35 a signal is output to the pulse motor 22 to order it to rotate in the reverse direction by the proper amount required to reduce the engine revolution speed from its present value by the previously determined revolution speed unit ΔN. This causes the pulse motor 22 to rotate in the reverse direction, and thereby the revolution speed of the engine 21 is reduced by the amount ΔN. In this way, the maximum value ΔN for the above described revolution speed unit is the maximum revolution speed amount which can be incremented or decremented while one cycle through this program loop is executed.

On the other hand, since the negative decision in the step S34 means that the controlled revolution speed is lower than the target revolution speed Nro, in the step S36 a signal is output to the pulse motor 22 to order it to rotate in the forward direction by just the proper amount required to increase the engine revolution speed from its present value by the above described revolution speed unit ΔN. This causes the pulse motor 22 to rotate in the forward direction, and the revolution speed of the engine 21 is increased by the amount ΔN. On the other hand, if in the decision step S33 the result of the decision is NO, then the flow of control proceeds to the step S37, in which a motor stop signal is output, and the revolution speed of the engine 21 is maintained at a constant value. After executing one or the other of the steps S35 through S37, the flow of control returns back to the beginning of program loop.

Next, the operation of this second embodiment constituted as described above will be explained.

During vehicle propulsion, the target revolution speed set according to the fuel lever 57a is left at minimum and the engine revolution speed is controlled by the use of the vehicle driving pedal 6a. Accordingly, the target revolution speed Nt output from the function generator 362 according to the pilot pressure Pi for vehicle propulsion is selected by the maximum value selection circuit 364.

During vehicle propulsion at constant speed on level ground, the pump pressure Pp is in the range from P1 to P2, and thus the revolution speed correction Δα from the function generator 363 is zero. Accordingly, the engine revolution speed is controlled to be the target revolution speed Nt depending upon the amount by which the vehicle driving pedal is depressed.

When the vehicle is being propelled up a slope and the pump pressure Pp takes on a value which exceeds the value P2, a positive revolution speed correction +Δα corresponding to the pump pressure Pp is outputted from the function generator 363. Accordingly, the integrated value of this revolution speed correction +Δα is added to the target revolution speed Nt determined by the amount by which the vehicle driving pedal is depressed, and the engine revolution speed is controlled to be somewhat higher than during vehicle propulsion on level ground. That is to say, the engine operates in a condition in which it develops a greater output power, as compared to the case of vehicle propulsion at constant speed on level ground.

When the vehicle is being propelled down a slope and the pump pressure Pp takes on a value which is lower than the value P1, a negative revolution speed correction −Δα corresponding to the pump pressure Pp is outputted from the function generator 363. Accordingly, the integrated value of the revolution speed correction −Δα is subtracted from the target revolution speed Nt determined by the amount by which the vehicle driving pedal is depressed, and the engine revolution speed is controlled to be somewhat lower than during vehicle propulsion on level ground.

In this case, if the maximum revolution speed according to the vehicle driving pedal 6a is designated as N1, according to the operation of the maximum tilt angle setting section 167 of FIG. 11, the maximum tilt angle θM of the hydraulic pump 1 is limited by the angle θ1, so that at this maximum revolution speed N1 a limit speed of 35 km/h is not exceeded. In other words, it is ensured that the maximum revolution speed during vehicle propulsion on level ground is limited to N1, and the maximum tilt angle during vehicle propulsion on level ground is limited to θ1. Accordingly, the maximum pump output flow amount Qtmax during vehicle propulsion on level ground is given by the equation.

When the vehicle is being propelled up a slope and the engine revolution speed becomes greater than N1, in order not to exceed the limit speed of 35 km/h, the maximum tilt angle θM of the hydraulic pump 1 is reduced from θ1 by an amount corresponding to the engine revolution speed. If the maximum revolution speed when the vehicle is being propelled up a slope is designated as N2, and designating the maximum tilt angle as θ2, as described above, Qtmax is given by the equation:

$$N2 \times \theta 2 = N1 \times \theta 1 = Qtmax.$$

Even in the range where N1<Ng<N2 and θ1>θg>θ2, the engine revolution speed and the pump tilt angle can be properly matched together, so that Qtmax becomes equal to Ng×θg.

When the vehicle is being propelled down a slope and the engine revolution speed becomes less than N1, in the range up to the revolution speed N0, the maximum tilt angle θM of the hydraulic pump 1 is increased from θ1 in accordance with the engine revolution speed so as not to exceed the limit speed of 35 km/h. In the range in which the revolution speed is less than N0, the maximum tilt angle θM is limited by its maximum value θmax=θ0. Also in this case Qtmax is given by the following equation:

$$N0 \times \theta 0 = N1 \times \theta 1 = Qtmax.$$

Even in the range where N0<Ng<N1 and θ0>θg>θ1, the engine revolution speed and the pump tilt angle can be properly matched together so that Qtmax becomes equal to Ng×θg.

Figure 14A:
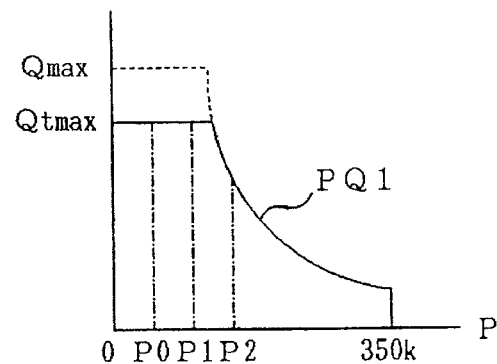
FIG. 14A is a figure giving a P-Q graph when the vehicle is being propelled on the level ground.
Figure 14B:
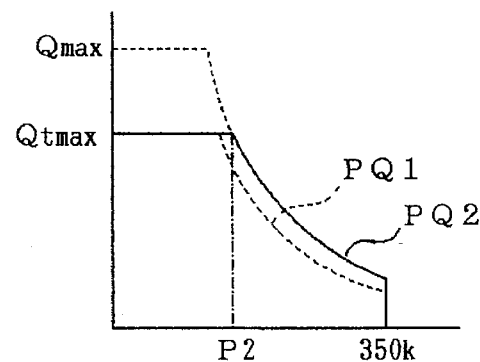
FIG. 14B is a figure giving a P-Q graph when the vehicle is being propelled up a slope.
Figure 14C:
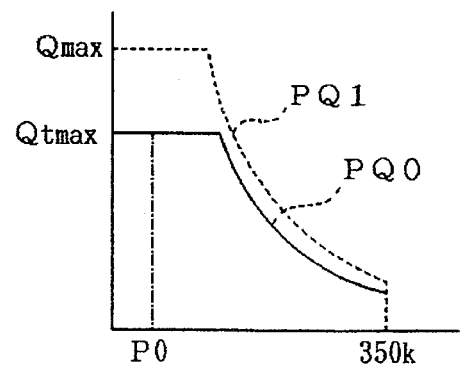
FIG. 14c is a figure giving a P-Q graph when the vehicle is being propelled down a slope.

According to the above described method of controlling the engine revolution speed and the displacement of the hydraulic pump, the P-Q graphs for when the vehicle is being propelled along level ground, for when the vehicle is being propelled up a slope, and for when the vehicle is being propelled down a slope are respectively as in FIGS. 14A through 14C. Now, referring to FIGS. 14A through 14C, Qmax refers to the maximum flow amount which can be ejected from the hydraulic pump, when the engine revolution speed is at its maximum and the pump tilt angle is at its maximum.

FIG. 14A is the P-Q graph when the vehicle is being propelled on the level ground. In order not to exceed the maximum output power at the engine revolution speed N1 the tilt angle control curve is set to be as shown by the line PQ1, and, as described above, because the maximum tilt angle θmax is limited to θ1, the output flow of the pump at the engine revolution speed N1 is controlled not to exceed the maximum value Qtmax. Accordingly, the portion of the flow graph shown by the broken line is elided.

FIG. 14B is the P-Q graph when the vehicle is being propelled up a slope. In order not to exceed the maximum output power at the engine revolution speed N2 the tilt angle control curve is set to be as shown by the line PQ2, and, as described above, because the maximum tilt angle θmax is limited to θ2, the output flow of the pump at the engine revolution speed N2 is controlled not to exceed the maximum value Qmax. Accordingly, the portion of the flow graph shown by the broken line is elided.

FIG. 14C is the P-Q graph when the vehicle is being propelled down a slope. In order not to exceed the maximum output power at the engine revolution speed N0 the tilt angle control curve is set to be as shown by the line PQ0, and, because the maximum tilt angle can be controlled to be increased until the hydraulic pump develops its maximum power value, the maximum pump output flow Qtmax (=Qmax) is in this case as determined by the P-Q graph. There is no overriding upper limit control therefor as there was in the case of the vehicle being propelled on the level ground or in the case of the vehicle being propelled up a slope.

Now, an explanation will be given relating to a specific operation, according to the tilt angle control of the variable displacement hydraulic pump 1 in this second embodiment.

In the present embodiment, because, along with the target tilt angles θL and θT being outputted respectively from the load sensing control section 161 and the torque control section 162, the maximum tilt angle θM is output from the maximum tilt angle setting circuit 167 and the smallest of these values is selected by the minimum value selection section 163, the maximum value of tilt angle is limited by the maximum tilt angle θM. Further, along with the basic P-Q graph being set by the torque control section 162, the maximum revolution speed according to the vehicle driving pedal 6a is set to be N1. When the vehicle is being propelled up a slope, the engine is operated at a relatively high revolution speed as compared to when the vehicle is being propelled on level ground, while when the vehicle is being propelled down a slope the engine is operated at a relatively low revolution speed as compared to when the vehicle is being propelled on level ground. On this basis the P-Q graphs shown in FIGS. 14A through 14C are obtained.

Figure 15:
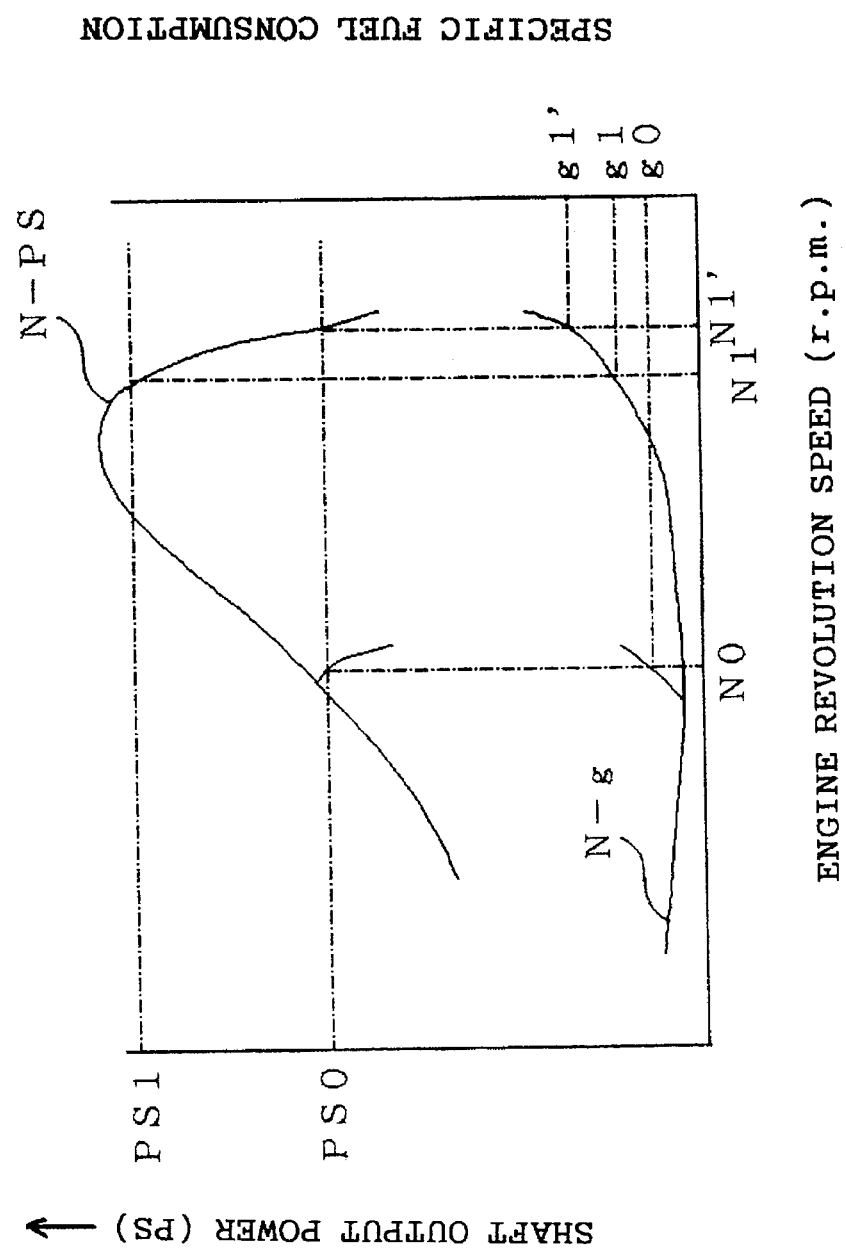
FIG. 15 is a graph showing the improved specific fuel consumption when the vehicle is being propelled down a slope.

FIG. 15 is a graph for improvement of the elevation of the specific fuel consumption when the vehicle is being propelled down a slope, and corresponds to FIG. 18 which will be described hereinafter. During propulsion of the vehicle down a slope, the engine revolution speed is decreased to N0, and the engine output power is reduced to the power PS0 required to be absorbed by the pump when descending a slope, so that the specific fuel consumption g0 when the vehicle is being propelled down a slope is shown to be decreased so as to be less than the specific fuel consumption g1 when the vehicle is being propelled along level ground.

Next, a detailed explanation will be given relating to the type of effect of improvement of specific fuel consumption.

The present inventors, in Japanese Patent Laying Open Publication Showa 63-167042, have previously proposed a hydraulic control device for a hydraulically propelled work vehicle such as a wheel type hydraulic shovel or the like, which improves fuel consumption during vehicle propulsion. A summary of that control device is as follows.

Figure 16A:
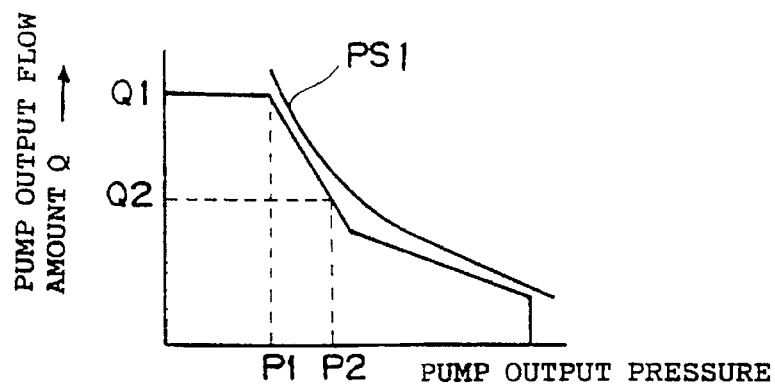
FIG. 16A is a P-Q graph for explanation of the related art.
Figure 16B:
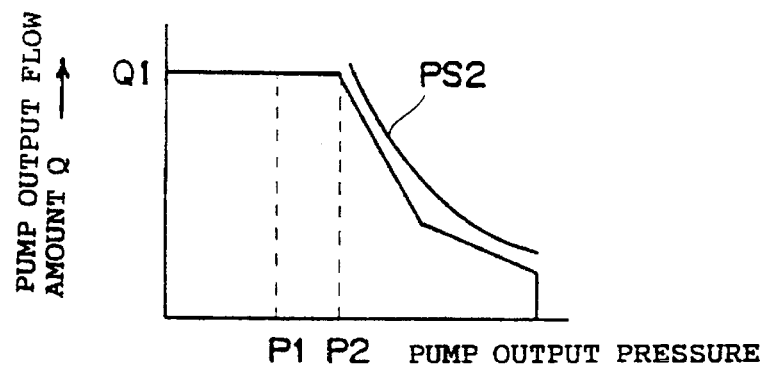
FIG. 16B is a P-Q graph for explanation of the related art.

When the pump output flow amount required, when the vehicle is being propelled upwards at the speed limit of 35 km/h along an upwardly sloping road with a certain gradient, and the required pressure are determined as Q1 and P2 (which is greater than P1) respectively, then for example, as shown in FIG. 16B the required power PS2 of the engine is determined. Further, the engine maximum revolution speed N2 and the maximum displacement q2 of the hydraulic pump are determined. For example, the graph of engine revolution speed versus pump output flow (the N-Q graph) may be as shown in FIG. 17.

Figure 17:
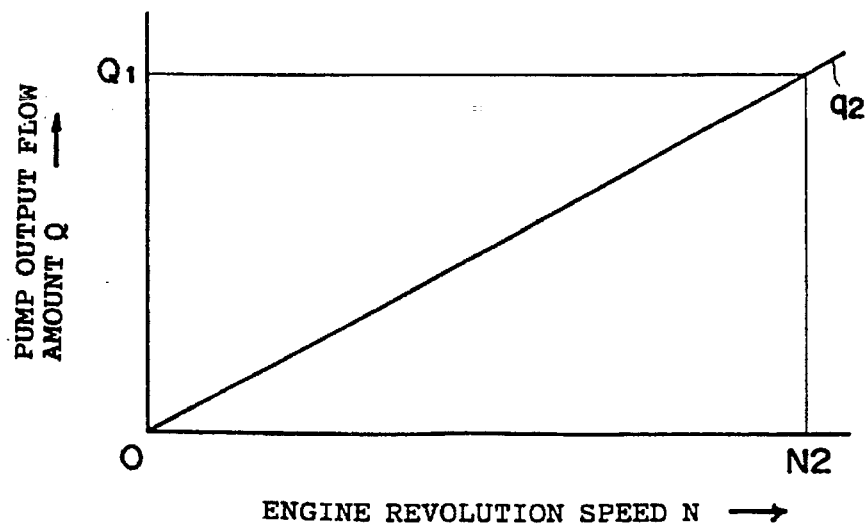
FIG. 17 is an N-Q graph for explanation of the related art.
Figure 18:
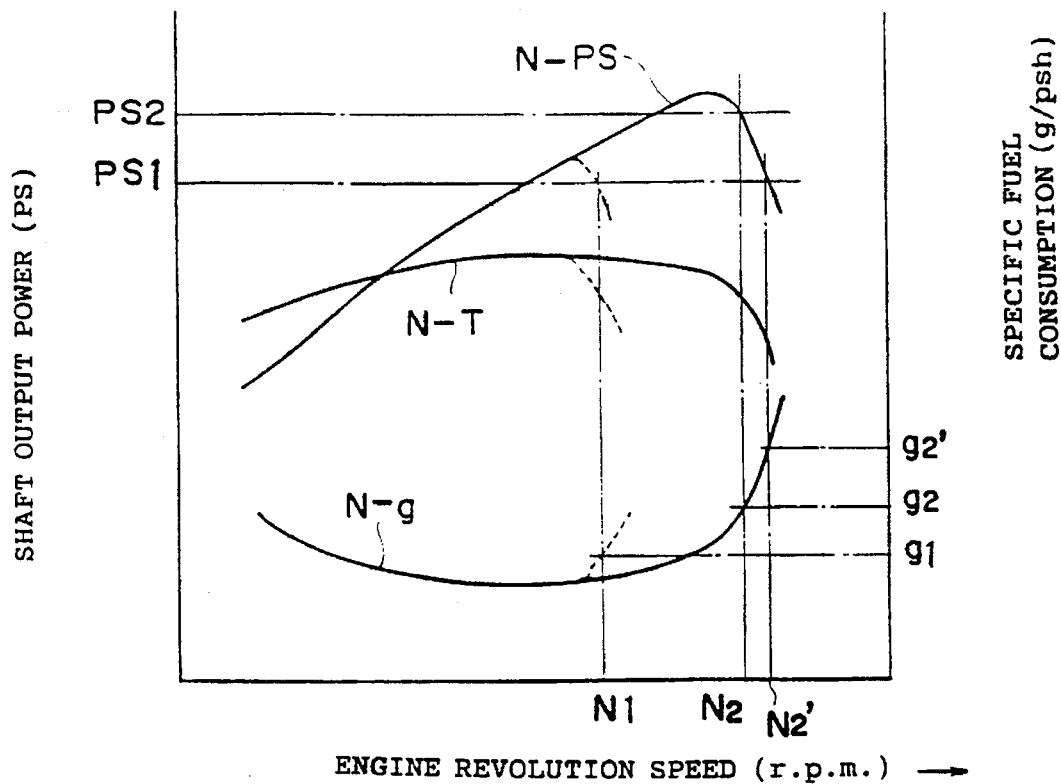
FIG. 18 is a graph for explanation of the specific fuel consumption in the related art.

Typically, the performance of the engine for the hydraulic type vehicle propulsion system which has the N-Q graph shown in FIG. 17 may be determined as shown in FIG. 18. As will be understood from the curve of revolution speed versus output power shown in FIG. 18, if the power required to be absorbed by the hydraulic pump when the vehicle is being propelled upwards at 35 km/h along an upwardly sloping road with the certain gradient is designated by PS2, then this power will be developed when the engine revolution speed is equal to N2. And further, from the curve of engine revolution speed versus specific fuel consumption (the N-g graph), the specific fuel consumption at this time (g/PSh) will be understood to be equal to g2.

On the other hand, if the power absorbed by the hydraulic pump when the vehicle is being propelled at 35 km/h along a level road by this kind of hydraulic type vehicle propulsion system is designated by PS1 (which is less than PS2), then it will be understood that, if the vehicle is propelled along a level road with the engine at full throttle, the engine revolution speed at this time will be N2' (which is greater than N2), and the specific fuel consumption will be g2' (which is greater than g2). That is to say, with these settings for the engine and the hydraulic system, during vehicle propulsion on level ground at 35 km/h it is not desirable for the engine to be used in this bad specific fuel consumption region. Further if, in order to use the engine in its good specific fuel consumption region during vehicle propulsion on level ground, the engine revolution speed is lowered and the power graph is set to PS1 of FIG. 16A, then the load pressure becomes P2 and the pump output flow amount becomes Q2 when the vehicle is being propelled up a slope, and it is not possible to develop a speed equal to the speed limit of 35 km/h.

Figure 19:
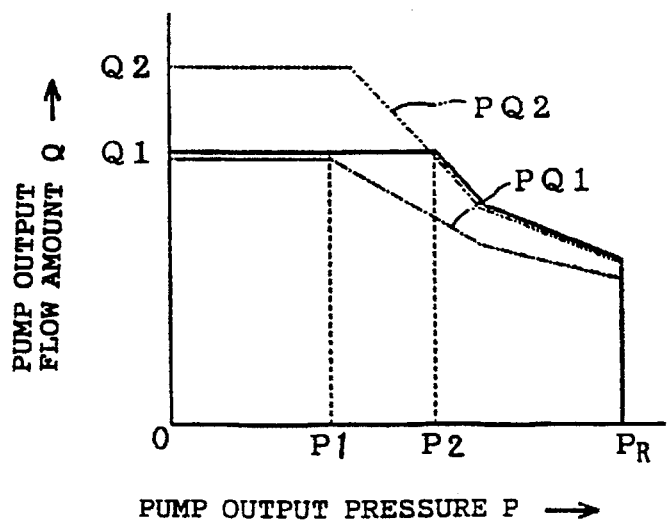
FIG. 19 is a P-Q graph for intending the related art specific fuel consumption to be improved when the vehicle is being propelled on level ground and when it is being propelled up a slope.

Thus, with reference to Japanese Patent Laying Open Publication Showa 63-167042, as shown in FIG. 19, until the load pressure reaches a predetermined value P1 corresponding to vehicle propulsion on level ground, the engine revolution speed is set to N1 so that the engine power becomes PS1 (the line PQ1 of the P-Q graph), and in the range where the load pressure exceeds the predetermined value P1, until the engine power becomes equal to PS2 (the line PQ2 of the P-Q graph), the engine revolution speed is increased according to the load pressure. At this time, in order not to exceed the speed limit, in other words in order for the pump output flow amount not to exceed Q1, the displacement is reduced along with the increase in engine revolution speed, and the P-Q graph shown by the solid line in FIG. 19 is obtained. By doing this, the optimal matching of the power absorbed by the hydraulic pump in correspondence to the load and the engine output power is performed, and the engine and the hydraulic pump are controlled in the operational conditions which provide the best specific fuel consumption (g1 in FIG. 18).

By the way, the load pressure when a wheel type hydraulic shovel is being propelled down a slope is also lower than during propulsion on level ground so that the required power is PS0 which is less than PS1. Because of this, even if by using the above described system of Japanese Patent Laying Open Publication Showa 63-167042, the engine revolution speed is reduced as low as N1 during vehicle propulsion on level ground. Nevertheless when the vehicle is being propelled down a slope as shown in FIG. 15, the engine revolution speed rises up to the value N1' and, accordingly, the specific fuel consumption becomes g1', i.e. is made worse. In this connection, the specific fuel consumption during vehicle propulsion on level ground at the engine revolution speed N1 is g1, which is less than g1'. Thus, with the prior art device described above, the power absorbed by the hydraulic pump when the vehicle is being propelled down a slope and the output power of the engine are not optimally matched from the point of view of specific fuel consumption. Therefore, as described above, by the engine revolution speed when the vehicle is being propelled down a slope being lowered down to N0, the specific fuel consumption is improved to g0.

Now, it should be understood that the above explained tilt angle control device 40 is not in any way limited in this embodiment, and it would be possible to use various well known types of tilt angle control device. Further, although in this embodiment the process was performed of reducing the engine revolution speed by integrating the negative correction therefor according to the load pressure when the vehicle was being propelled down a slope, various other methods might also be adopted. For example, the condition of vehicle propulsion down a slope might be detected from the signal from the brake switch, the forward/reverse changeover switch, the vehicle propulsion pilot pressure sensor, or the pump pressure sensor. In such a case, there is the possibility for the engine revolution speed to be lowered by the governor lever being driven mechanically. Further, although in the above described embodiment the vehicle speed was kept constant by the pump tilt angle being increased in accordance with reduction of the engine revolution speed, it would also be acceptable, in a region in which there was no problem about alteration in the vehicle speed, for this correspondence with reduction in engine revolution speed not to be strictly reciprocal.

The present invention can be generally applied to a work vehicle such as a wheel type hydraulic shovel, or the like, in which pressurized hydraulic fluid is supplied from a hydraulic pump which is disposed in an upper rotating body portion thereof to a hydraulic motor for vehicle propulsion which is disposed in a lower moving body portion thereof.

We claim:
1. A control device for a hydraulically propelled work vehicle, comprising:
   a variable displacement hydraulic pump which is disposed in an upper rotating body portion and which is driven by an engine;
   an engine revolution speed control means which controls a revolution speed of said engine;
   a hydraulic motor for vehicle propulsion which is disposed in a lower moving body portion and which is driven by hydraulic fluid ejected from said hydraulic pump;
   a hydraulic actuator for performing work which is driven by hydraulic fluid ejected from said hydraulic pump;
   a first and a second control valve means, respectively provided between said hydraulic pump and said hydraulic motor for vehicle propulsion, and between said hydraulic pump and the hydraulic actuator for performing work, and controlling the flow amounts of pressurized hydraulic fluid which respectively is supplied to said hydraulic motor for vehicle propulsion and to said hydraulic actuator for performing work;
   a displacement variation means which varies the displacement of said hydraulic pump; and,
   a displacement control means which, at least when a pump pressure results in a surplus torque, in order to limit an input torque, determines a target displacement for input torque limitation which becomes smaller as the pump pressure is higher and controls said displacement variation means accordingly; wherein,
   said hydraulically propelled work vehicle is equipped with at least a center joint provided in a flow conduit between said hydraulic pump and the hydraulic motor for vehicle propulsion; characterized in that:
   said control device further comprises a condition discrimination means which discriminates whether the current operational condition is a vehicle propulsion condition or a performing work condition wherein,
   said engine revolution speed control means limits an engine maximum revolution speed to a first revolution speed when it is discriminated that the current operational condition is the vehicle propulsion condition, and limits the engine maximum revolution speed to a second revolution speed not greater than said first revolution speed when it is discriminated that the current operational condition is the performing work condition;
   said displacement control means limits a maximum displacement to a first displacement value when it is discriminated that the current operational condition is the vehicle propulsion condition, and limits the maximum displacement to a second displacement value higher than said first displacement value when it is discriminated that the current operational condition is the performing work condition; and,
   said first and said second revolution speeds and said first and said second displacement values are so determined that said first revolution speed multiplied by said first displacement value at least as relating to the pressure for vehicle propulsion on level ground is less than said second revolution speed multiplied by said second displacement value as relating to pressure below the range of torque limitation control in order to reduce a pressure loss of said center point.

2. A control device according to claim 1, further characterized in that said first revolution speed is greater than said second revolution speed.

3. A control device according to claim 1, further characterized in that said displacement control means includes:

a means for determining a target displacement for load sensing control so that the output pressure of said hydraulic pump is kept at just a fixed target value higher than a load pressure of said hydraulic actuator;

a means for determining a maximum target displacement for vehicle propulsion when-said work vehicle is propelling;

a means for determining a maximum target displacement for performing work while performing work; and, a selection means which selects the minimum one from among said target displacement for input torque limitation, said target displacement for load sensing control, and either said maximum target displacement for vehicle propulsion, or said maximum target displacement for performing work; wherein, said displacement variation means is controlled so that said displacement of said hydraulic pump becomes the target displacement selected by said selection means.

4. A control device according to claim 3, further characterized by comprising a slope descending detection means which detects when the vehicle is descending down a slope; wherein said means for determining a maximum target displacement for vehicle propulsion, when the pressure for when the vehicle is descending down a slope is detected, limits the target displacement to a value larger than the maximum value during vehicle propulsion on level ground.

5. A control device according to claim 1, further characterized by comprising a slope descending detection means which detects when the vehicle is descending down a slope; wherein said displacement control means, when it is detected that the vehicle is descending down a slope, limits the maximum displacement to a third displacement value higher than said first displacement value.

* * * * *